United States Patent
Chen et al.

(10) Patent No.: US 12,495,260 B2
(45) Date of Patent: *Dec. 9, 2025

(54) METHOD OF MAKING MEMS MICROPHONE WITH AN ANCHOR

(71) Applicant: SKYWORKS SOLUTIONS, INC., Irvine, CA (US)

(72) Inventors: Guofeng Chen, Fremont, CA (US); Yu Hui, Pleasanton, CA (US)

(73) Assignee: SKYWORKS SOLUTIONS, INC., Irvine, CA (US)

( * ) Notice: Subject to any disclaimer, the term of this patent is extended or adjusted under 35 U.S.C. 154(b) by 177 days.

This patent is subject to a terminal disclaimer.

(21) Appl. No.: 18/156,155

(22) Filed: Jan. 18, 2023

(65) Prior Publication Data

US 2023/0239641 A1 Jul. 27, 2023

Related U.S. Application Data

(60) Provisional application No. 63/302,785, filed on Jan. 25, 2022.

(51) Int. Cl.
  *H04R 31/00* (2006.01)
  *B81B 3/00* (2006.01)
  (Continued)

(52) U.S. Cl.
  CPC .......... *H04R 31/006* (2013.01); *B81B 3/0072* (2013.01); *B81C 1/00666* (2013.01);
  (Continued)

(58) Field of Classification Search
  CPC .......... H04R 31/006; H04R 7/04; H04R 7/18; H04R 17/02; H04R 19/04; H04R 31/003;
  H04R 2201/003; B81B 3/0072; B81B 2201/0257; B81B 2203/0127; B81B 2203/0307; B81C 1/00666;
  (Continued)

(56) References Cited

U.S. PATENT DOCUMENTS 8,948,419 B2  2/2015  Zhang
9,055,372 B2  6/2015  Grosh et al.
(Continued)

FOREIGN PATENT DOCUMENTS

CN  107128870 A   9/2017
EP   3557881 A1  10/2019
(Continued)

OTHER PUBLICATIONS

English machine translation of KR-101058475-B1 (Hur et al.; MEMS Microphone Based On Graphene Membrane and Fabrication Method Therefor; published Aug. 2011) (Year: 2011).*
(Continued)

*Primary Examiner* — Mark Fischer
(74) *Attorney, Agent, or Firm* — Lando & Anastasi, LLP

(57) ABSTRACT

A method for manufacturing a microelectromechanical systems (MEMS) microphone comprises depositing a membrane on a first sacrificial layer, wherein the first sacrificial layer is deposited on a substrate, etching the substrate to define a cavity, releasing the membrane by removing at least the first sacrificial layer, and forming at least one anchor at the edge of the membrane.

21 Claims, 16 Drawing Sheets

(51) Int. Cl.
  *B81C 1/00* (2006.01)
  *H04R 7/04* (2006.01)
  *H04R 7/18* (2006.01)
  *H04R 17/02* (2006.01)
  *H04R 19/04* (2006.01)

(52) U.S. Cl.
  CPC ................ *H04R 7/04* (2013.01); *H04R 7/18* (2013.01); *H04R 17/02* (2013.01); *H04R 19/04* (2013.01); *H04R 31/003* (2013.01); *B81B 2201/0257* (2013.01); *B81B 2203/0127* (2013.01); *B81B 2203/0307* (2013.01); *B81C 2201/0105* (2013.01); *B81C 2201/0132* (2013.01); *B81C 2203/0118* (2013.01); *H04R 2201/003* (2013.01)

(58) Field of Classification Search
  CPC .... B81C 2201/0105; B81C 2201/0132; B81C 2203/0118
  See application file for complete search history.

(56) References Cited

U.S. PATENT DOCUMENTS

| | | | |
|---|---|---|---|
| 9,832,573 | B2 | 11/2017 | Hall et al. |
| 9,902,612 | B2 | 2/2018 | Dehe et al. |
| 10,626,007 | B2 | 4/2020 | Bretthauer et al. |
| 10,964,880 | B2 | 3/2021 | Grosh et al. |
| 2008/0123878 | A1 | 5/2008 | Zhe et al. |
| 2009/0092273 | A1 | 4/2009 | Zhe et al. |
| 2011/0051985 | A1 | 3/2011 | Hwang et al. |
| 2013/0121509 | A1 | 5/2013 | Hsu et al. |
| 2016/0219374 | A1 | 7/2016 | Hall et al. |
| 2016/0219375 | A1 | 7/2016 | Hall et al. |
| 2017/0085994 | A1 | 3/2017 | Clerici et al. |
| 2017/0186940 | A1 | 6/2017 | Bevilacqua et al. |
| 2018/0091905 | A1 | 3/2018 | Clerici et al. |
| 2018/0299335 | A1* | 10/2018 | Wong ..................... G01B 7/18 |
| 2019/0281393 | A1 | 9/2019 | Grosh et al. |
| 2019/0327562 | A1 | 10/2019 | Cerini et al. |
| 2020/0148532 | A1 | 5/2020 | Grosh et al. |
| 2020/0351595 | A1 | 11/2020 | Rusconi Clerici Beltrami et al. |
| 2020/0382876 | A1 | 12/2020 | Cerini et al. |
| 2021/0051413 | A1 | 2/2021 | Hui et al. |
| 2021/0084423 | A1 | 3/2021 | Rusconi Clerici Beltrami et al. |
| 2021/0120346 | A1 | 4/2021 | Hui et al. |
| 2021/0136483 | A1 | 5/2021 | Hsieh et al. |
| 2021/0385584 | A1 | 12/2021 | Goswami et al. |
| 2022/0073342 | A1 | 3/2022 | Ho et al. |
| 2022/0267141 | A1 | 8/2022 | Chen et al. |
| 2022/0272459 | A1 | 8/2022 | Chen et al. |
| 2022/0332568 | A1 | 10/2022 | Barsukou |
| 2022/0402752 | A1 | 12/2022 | Goswami et al. |
| 2023/0007405 | A1 | 1/2023 | Qian et al. |
| 2023/0011561 | A1 | 1/2023 | Qian et al. |
| 2023/0012046 | A1 | 1/2023 | Qian et al. |
| 2023/0039743 | A1 | 2/2023 | Hui et al. |
| 2023/0072672 | A1 | 3/2023 | Chen et al. |
| 2023/0104257 | A1 | 4/2023 | Barsukou et al. |
| 2023/0105699 | A1 | 4/2023 | Chen et al. |
| 2023/0127983 | A1 | 4/2023 | Chen et al. |
| 2023/0188896 | A1 | 6/2023 | Barsukou |
| 2023/0234837 | A1* | 7/2023 | Chen ..................... H04R 31/00 257/416 |
| 2023/0303387 | A1 | 9/2023 | Barsukou |
| 2024/0098426 | A1 | 3/2024 | Barsukou |

FOREIGN PATENT DOCUMENTS

| | | | |
|---|---|---|---|
| JP | 2008118639 A | 5/2008 | |
| JP | 2019140638 A | 8/2019 | |
| KR | 101058475 B1 * | 8/2011 | ............. H04R 19/04 |

OTHER PUBLICATIONS

Chen et al. "Acoustic Transducers Built on Edge-released MEMS Structures," Solid-State Sensors, Actuators, and Microsystems Workshop Hilton Head Island, South Carolina, Jun. 6-10, 2010, pp. 234-237.

Chen et al., "Edge-released, piezoelectric MEMS acoustic transducers in array configuration," J. Micromech. Microeng. 22 (2012) 025005, pp. 1-9.

Huang et al., "High Sensitivity and High S/N Microphone Achieved by PZT Film with Central-Circle Electrode Design", IEEE, MEMS 2017, Las Vegas, NV, USA, Jan. 22-26, 2017, pp. 1188-1191.

Je et al., "In situ tuning of a MEMS microphone using electrodeposited nanostructures," Journal of Micromechanics and Microengineering, 19 (2009) 035015, pp. 1-8.

Je et al., "MEMS Capacitive Microphone with Dual-Anchored Membrane", Proceedings 2017, 1, 342; Aug. 9, 2017.

Knisely et al., "Method for Controlling Stress Gradients in PVD Aluminum Nitride", Journal of Micromechanics and Microengineering, vol. 28, No. 11, 2018.

Littrell, "High Performance Piezoelectric MEMS Microphones", A dissertation submitted in partial fulfillment of the requirements for the degree of Doctor of Philosophy (Mechanical Engineering) in The University of Michigan, 2010, 111 pages.

Lo et al., "Development of a No-Back-Plate SOI MEMS Condenser Microphone," IEEE, Transducers 2015, Anchorage, Alaska, Jun. 21-25, 2015, pp. 1085-1088.

Lo et al., "Sensitivity Improvement of No-Back-Plate MEMS Microphone Using Polysilicon Trench-refilled Process," IEEE, Transducers 2017, Kaohsiung, Taiwan, Jun. 18-22, 2017, pp. 1171-1174.

Mohamad et al., "Modelling and Optimisation of a Spring-Supported Diaphragm Capacitive MEMS Microphone", Engineering, 2010, 2, 762-770.

Peña-García et al., "Design and Modeling of a MEMS Dual-Backplate Capacitive Microphone with Spring-Supported Diaphragm for Mobile Device Applications," Sensors (2018), 18, 3545, 30 pages.

Pulskamp et al. "Mitigation of residual film stress deformation in multilayer microelectromechanical systems cantilever devices." Journal of Vacuum Science & Technology B: Microelectronics and Nanometer Structures Processing, Measurement, and Phenomena 21.6 (2003): 2482-2486.

Segovia-Fernandez et al., "Monolithic Piezoelectric Aluminum Nitride MEMS-CMOS Microphone", IEEE (2017), Transducers 2017, Kaohsiung, Taiwan, Jun. 18-22, 2017, pp. 414-417.

Shah et al., "Design Approaches of MEMS Microphones for Enhanced Performance", Hindawi, Journal of Sensors, vol. 2019, Article ID 9294528, Mar. 6, 2019, 26 pages.

Udvardi et al., Spiral-Shaped Piezoelectric MEMS Cantilever Array for Fully Implantable Hearing Systems. Micromachines (2017) 8, 311, 13 pages.

Williams et al., "An AlN MEMS Piezoelectric Microphone for Aeroacoustic Applications", Journal of Microelectromechanical Systems, vol. 21, No. 2, Apr. 2012, pp. 270-283.

Yamashita et al., "Diaphragm deflection control of piezoelectric ultrasonic microsensors for sensitivity improvement", Sensors and Actuators A 139 (2007), pp. 118-123.

Yan et al., "Corrugated Diaphragm for Piezoelectric Microphone", IEEE, 1996, pp. 503-506.

\* cited by examiner

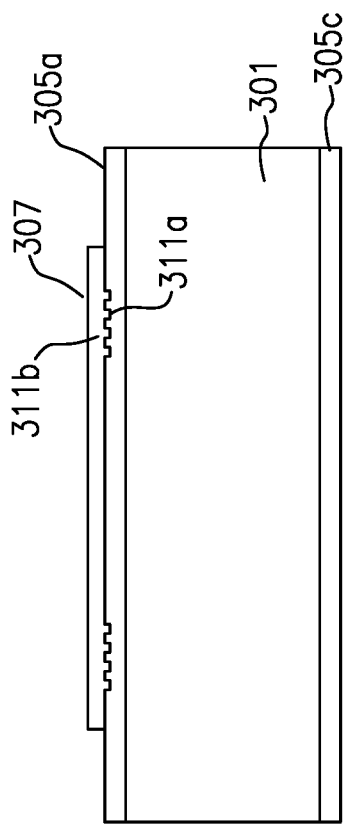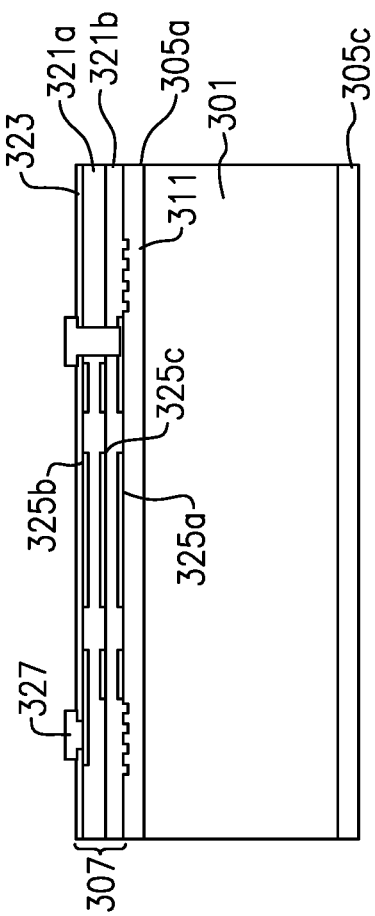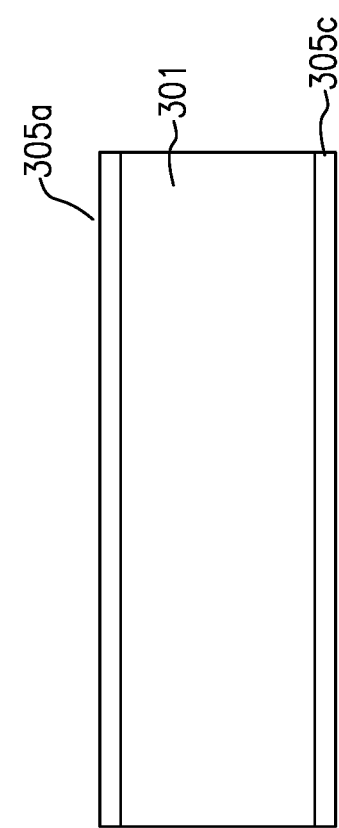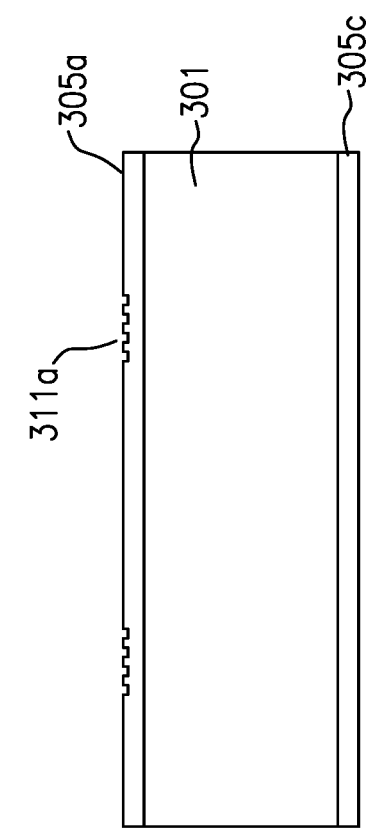

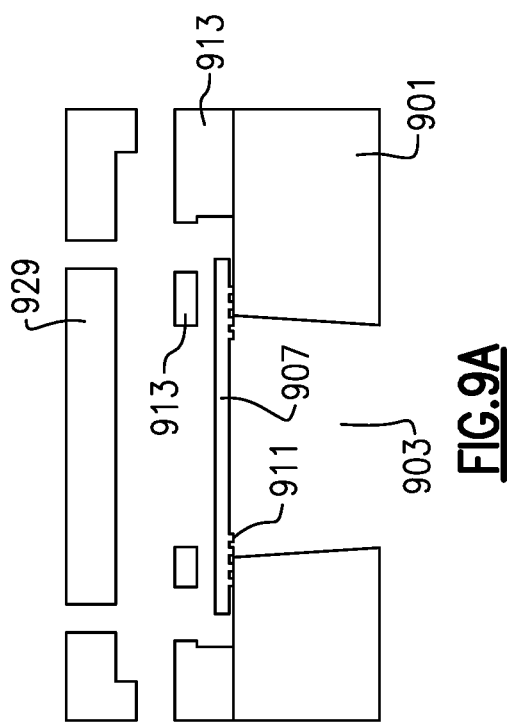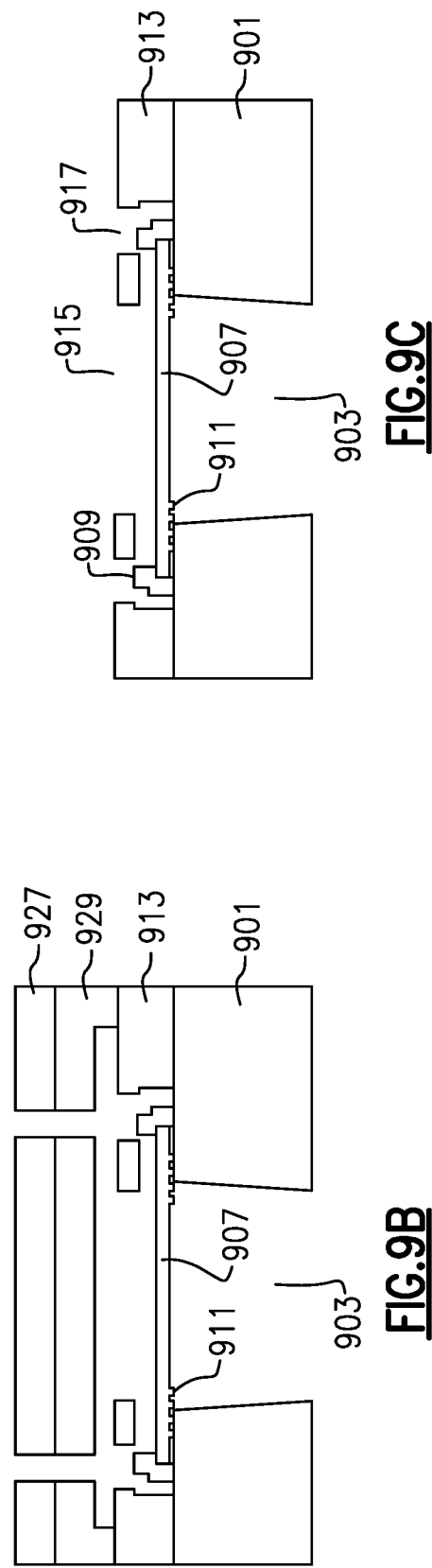

METHOD OF MAKING MEMS MICROPHONE WITH AN ANCHOR

CROSS-REFERENCE TO RELATED APPLICATIONS

This application claims priority under 35 U.S.C. § 119(e) to U.S. Provisional Patent Application Ser. No. 63/302,785, titled "METHOD OF MAKING MEMS MICROPHONE WITH AN ANCHOR," filed Jan. 25, 2022, the entire content of which is incorporated herein by reference for all purposes.

BACKGROUND

Field

The present disclosure relates to a piezoelectric microelectromechanical systems (MEMS) microphone, and in particular a piezoelectric MEMS microphone with a membrane.

Description of the Related Technology

A MEMS microphone is a micro-machined electromechanical device used to convert sound pressure (e.g., voice sound) to an electrical signal (e.g., voltage). MEMS microphones are widely used in mobile devices, headsets, smart speakers and other voice-interface devices or systems. Conventional capacitive MEMS microphones suffer from high power consumption (e.g., large bias voltage) and reliability, for example when used in a harsh environment (e.g., when exposed to dust and/or water).

Piezoelectric MEMS microphones have been used to address the deficiencies of capacitive MEMS microphones. Piezoelectric MEMS microphones offer a constant listening capability while consuming almost no power (e.g., no bias voltage is needed), are robust and immune to water and dust contamination.

Piezoelectric MEMS microphones work on the principle of piezoelectric effect, so that they convert acoustic signals to electric signals when sound waves vibrate the piezoelectric sensor. The sound waves bend the piezoelectric film layers of a membrane or cantilevered beam, causing stress and strain, resulting in charges being generated in the piezoelectric film layers. The charges are converted to voltage as an output signal, by the placement of one or more electrodes on the piezoelectric film layers.

SUMMARY

According to one embodiment there is provided a method for manufacturing a microelectromechanical systems (MEMS) microphone. The method comprises depositing a membrane on a first sacrificial layer, wherein the first sacrificial layer is deposited on a substrate, etching the substrate to define a cavity, releasing the membrane by removing at least the first sacrificial layer, and forming at least one anchor at the edge of the membrane.

In one example the method further comprises depositing a second sacrificial layer on top of the deposited membrane, where the first and second sacrificial layers form a single sacrificial layer, dry etching the single sacrificial layer at the edge, depositing a layer of polysilicon on the single sacrificial layer, and etching areas of the polysilicon layer such that there is at least one section of polysilicon layer remaining and at least one section of the single sacrificial layer is exposed.

In one example the method further comprises depositing a photoresist layer on the remaining polysilicon layer and exposed single sacrificial layer, etching the photoresist layer to provide one or more etched areas and expose the single sacrificial layer, removing the single sacrificial layer via the one or more etched areas to release the membrane, and placing at least one anchor through the one or more etched areas such that the at least one anchor is in contact with the membrane.

In one example the method further comprises depositing a second sacrificial layer on top of the deposited membrane, where the first and second sacrificial layers form a single sacrificial layer, dry etching the single sacrificial layer at the edge of the membrane to expose at least one section of the membrane, depositing a layer of polysilicon on the remaining single sacrificial layer, etching areas of the polysilicon layer such that there is at least one section of polysilicon layer remaining and at least one section of the single sacrificial layer exposed, and removing the single sacrificial layer to release the membrane.

In one example the method of forming the at least one anchor further comprises depositing a material at least within the etched areas of the photoresist layers such that the material forms the at least one anchor at the edge of the membrane.

In one example the method further comprises bonding a wafer onto the at least one remaining section of polysilicon layer, depositing a layer of material at least within the etched areas of the poly silicon layer such that the material forms the at least one anchor at the edge of the membrane, and removing the cap wafer.

In one example the method further comprises bonding a wafer onto the at least one remaining section of polysilicon layer, wherein the wafer comprises a sound port and at least one stopper, where the at least one stopper is in contact with the membrane once the wafer is bonded to the at least one remaining section of polysilicon layer.

In one example the method of removing the single sacrificial layer further comprises etching by vapor hydrofluoric acid.

In one example the method of depositing the membrane on the single sacrificial layer further comprises depositing at least one layer of metal and depositing at least one layer of piezoelectric material, such that the layers of metal and piezoelectric material are alternated.

According to another embodiment there is provided a microelectromechanical systems (MEMS) microphone. The MEMS microphone comprises a substrate including at least one wall defining a cavity, a membrane supported by the at least one wall, and at least one anchor in contact with the membrane and the at least one wall, such that the membrane is only fixed to the at least one wall by the at least one anchor.

In one example the at least one anchor is formed from metal.

In one example the at least one anchor is formed from at least one stopper.

In one example the microphone further comprises a cap wafer attached to the at least one stopper.

In one example the microphone comprises an additional one or more anchors.

In one example the at least one anchor is formed by a material deposited after the membrane.

In one example the at least one anchor comprises a photoresist layer.

In one example the at least one anchor is formed by using a 3D printer.

In one example the at least one anchor is formed at a low temperature.

In one example the at least one anchor forms a ring around the edge of the membrane.

In one example the membrane has been released such that it has substantially no intrinsic stress.

In one example the at least one anchor is formed after the membrane has been released.

In one example the MEMS microphone is a piezoelectric MEMS microphone. Optionally the membrane comprises three electrodes and two piezoelectric film layers.

In one example the MEMS microphone is a capacitive MEMS microphone. Optionally the microphone comprises a back plate.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIGS. 3A-3D show cross-sectional views of steps of forming a membrane according to aspects disclosed herein;

FIGS. 9A-9C show cross-sectional views of steps of forming an anchor according to aspects disclosed herein;

DETAILED DESCRIPTION

Aspects and embodiments described herein are directed to a method of manufacturing a microelectromechanical systems (MEMS) microphone membrane after the membrane has been released from the substrate. This is advantageous as the intrinsic stress is able to be released from the membrane, and the membrane is then fixed to the substrate by an anchor, resulting in a stress-free membrane.

We have appreciated that in a conventional diaphragm piezoelectric MEMS microphone, the sensitivity of the microphone is significantly degraded with even a small amount of residual stress as the output energy is reduced when a static deflection of the membrane is caused by the intrinsic stress. A device according to aspects disclosed herein, in which the method of manufacturing of a microphone comprises releasing the microphone membrane to remove intrinsic stress, the sensitivity of the device is increased. It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
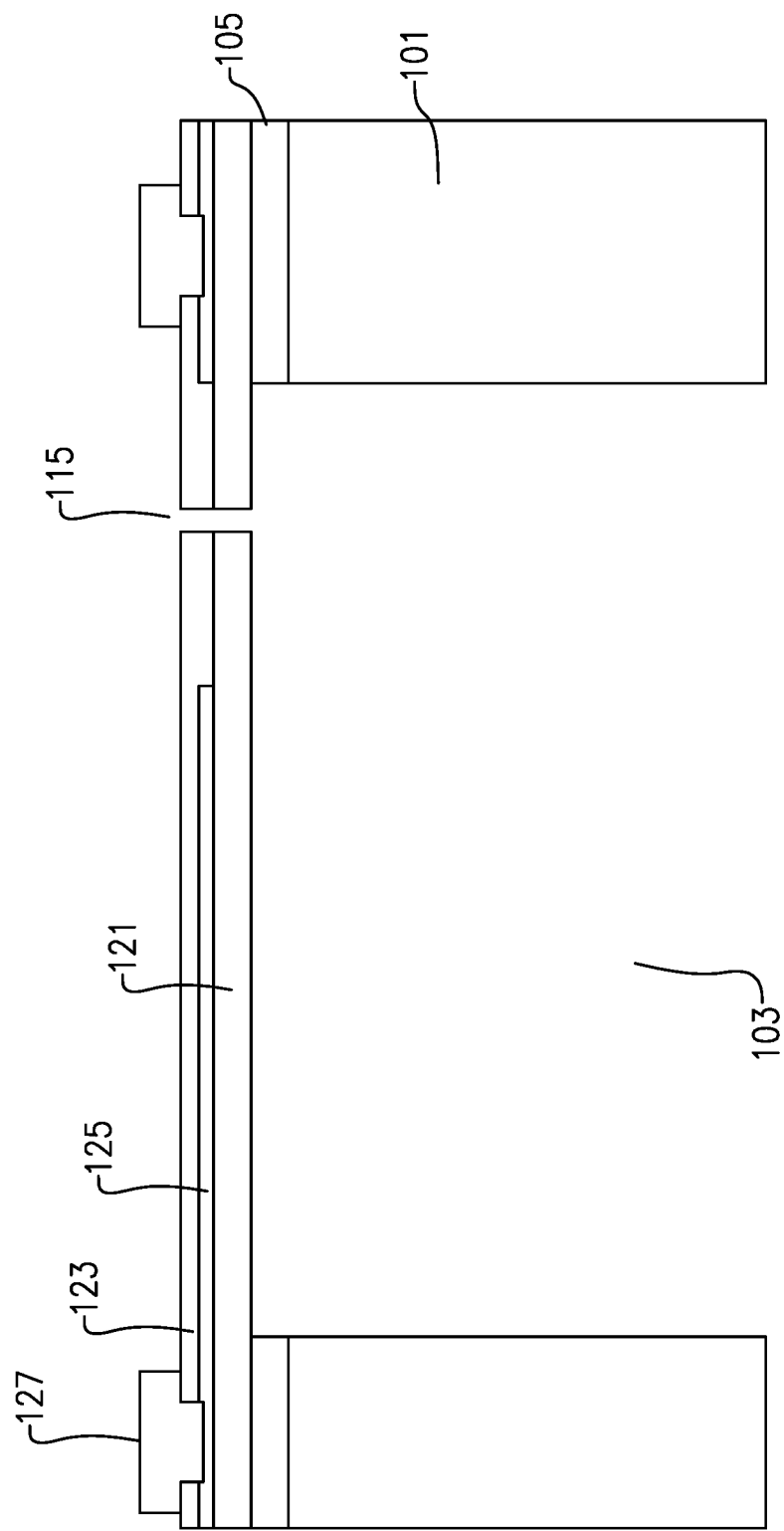
FIG. 1 shows a known microphone arrangement.

FIG. 1 shows a cross-sectional view of a piezoelectric MEMS microphone. The microphone comprises a substrate 101 wherein the substrate comprises walls. In some embodiments there may be four substrate walls, each meeting at a right angle, such that a polygonal cavity 103 is defined. In other embodiments the cavity may be circular, in which instance there may be one wall surrounding the cavity, such that the wall may be circular. It will be appreciated that in a cross-sectional view, two cavity walls are shown, although these may comprise the same circular cavity wall. The substrate may be silicon or any suitable material. The microphone further comprises a membrane, wherein the membrane comprises a piezoelectric film layer 121 which extends over a cavity such that the piezoelectric film layer 121 is supported by the substrate walls. The piezoelectric film layer may be aluminum nitride, lithium niobate, or lithium tantalate, or any other suitable piezoelectric material. The region at which the membrane overlaps the substrate walls, and thus the region at which the membrane is supported, is the anchor region. The microphone may comprise an insulating layer 105 located between the piezoelectric film layer 121 and the substrate 101. The microphone comprises at least one electrode 125. The electrode 125 may be any conductive material, such as molybdenum. The microphone may comprise a passivation layer 123. The passivation layer may be aluminum nitride. The microphone may comprise a bond pad 127 in contact with the electrode 125. In this arrangement the membrane comprises a vent hole 115 which extends through the membrane, such that air pressure may equalize either side of the membrane.

The microphone of FIG. 1 is manufactured by oxidizing a substrate 101, wherein the substrate may be silicon, to form an oxide layer 105. A membrane is deposited onto the oxide layer 105, wherein the membrane comprises at least one electrode 125, at least one piezoelectric film layer 121, a passivation layer 123, and at least one bond pad 127. A hole 115 is etched into the membrane, wherein the hole extends through the entire membrane, i.e., it passes through the passivation layer, one or more electrodes, and one or more piezoelectric film layers. The substrate 101 and oxide layer 105 are etched from the underside such that a cavity 103 is formed. The resultant device is a piezoelectric MEMS diaphragm microphone. It has been realized that the manufacturing process of the microphone of FIG. 1 results in residual stress, and the membrane may experience bending which results in a less sensitive microphone. Therefore, we have appreciated that alternate methods of manufacture result in a microphone with no residual stress, as will be described herein, in relation to various aspects.

FIGS. 2A-2D illustrate the general principles used in embodiments disclosed herein to manufacture a MEMS microphone. A cross-sectional view of a MEMS microphone is shown for each step of the manufacturing method. Before the first step of the method, there is a substrate 201, comprising at least one wall, such that there is a cavity 203 within the substrate. It will be appreciated that the cross-sectional view shows two side walls. In some embodiments there may be one circular wall, such that the microphone only comprises one substrate wall. In other embodiments there may be two side walls, and two end walls, such that there are four substrate walls, each meeting at a right angle, such that a rectangular cavity 203 is defined. The substrate may be silicon, or any suitable material. There is a sacrificial layer 205 deposited on the front side of the substrate. Herein, "front side" refers to the side of the device on which the membrane is located, and the opposite side is referred to as "back side" and is the side at which the cavity is located. The sacrificial layer may be any suitable material, such as silicon dioxide.

Figure 2A:
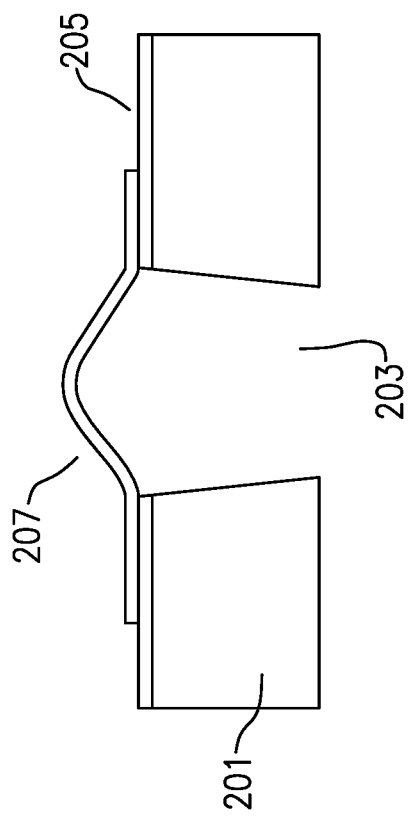
FIGS. 2A-2D show cross-sectional views of a method of manufacturing a microphone according to aspects disclosed herein.

FIG. 2A shows the first step of the method. A membrane is deposited on the sacrificial layer 205. It will be appreciated that any method of deposition may be used to deposit the membrane. As will be described elsewhere, the membrane comprises at least one electrode, and at least one piezoelectric layer. As shown, the membrane 207 is supported by the substrate walls, such that the membrane covers the entirety of the front side of the cavity. The membrane does not cover the entirety of the sacrificial layer 205, such that there is exposed sacrificial layer on either side of the membrane. The membrane is shown as bent in the middle, which is for illustrative purposes, to illustrate that there is residual stress within the membrane after its deposition during step 1 of the method of FIGS. 2A-2D. It will therefore be appreciated that the membrane is not bent to this extent in the actual device.

Figure 2B:
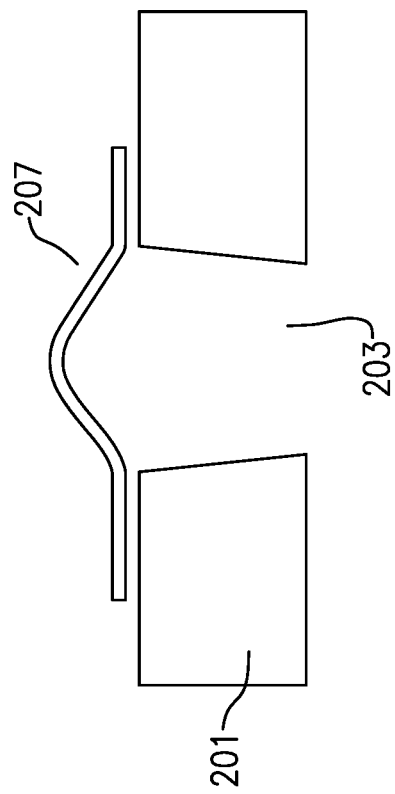

FIG. 2B shows the second step of the method. The sacrificial layer is removed, such that the membrane is detached, and the residual stress is released form the membrane. The membrane 207 is not in contact with the walls of the substrate 201 after the removal of the sacrificial layer. In this embodiment the sacrificial layer is formed from silicon dioxide, and the substrate is formed from silicon. Therefore, in this method the sacrificial layer is removed by vapor hydrofluoric acid (HF) which etches the silicon dioxide sacrificial layer without etching the silicon substrate. The hydrofluoric acid vapor may be formed from a diluted solution of HF which is vaporized to lessen the strength of the etching. It will be appreciated that other etching solutions may be used when the sacrificial layer is composed of another material. More generally herein when an etching step is described, this may be done in a variety of ways known the skilled person, depending upon the nature of the layer being etched, selected from: dry etching, wet etching, mechanical etching, illumination, laser etching, or other known methods.

Figure 2C:
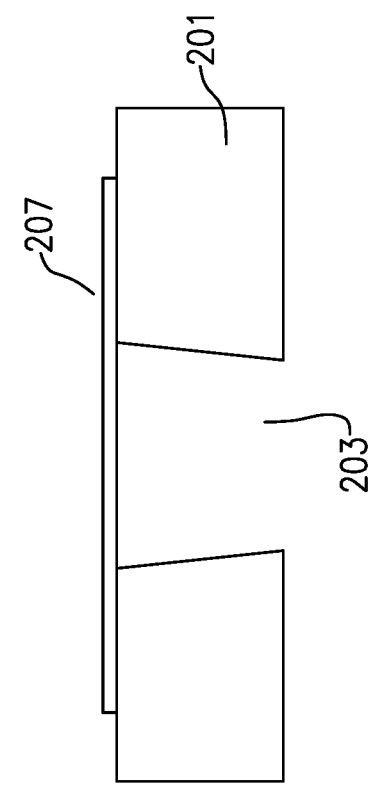

FIG. 2C shows the stress in the membrane having been released. The membrane in FIG. 2C is resting on the walls of the substrate 205. The membrane is not fixed to the substrate walls, but is supported by the walls, with the ability to move off the substrate walls. It has therefore been appreciated that although the residual stress of the membrane has been released, another step is required to fix the stress-free membrane to the substrate, as will be described now.

Figure 2D:
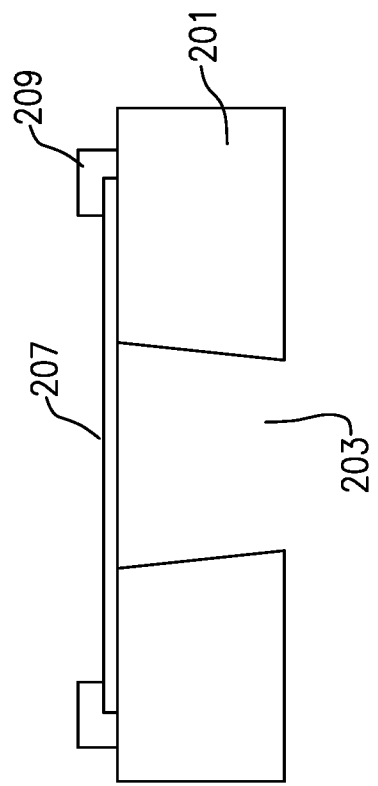

FIG. 2D shows the method step for fixing the stress-free membrane to the substrate, as created in the step of FIGS. 2B and 2C. The membrane is fixed to the substrate by the formation of at least one anchor 209 at the edge of the membrane. An anchor as used herein provides the function of fixing the membrane to the substrate at the location of the anchor. The anchor may be formed from a variety of materials separate from the membrane and the substrate and placed at selective locations. The membrane is therefore not fixed to the substrate other than by the anchor. Before the formation of the anchor, the membrane is resting on the substrate, but the membrane is not fixed to the substrate. It will be noted that in the cross-sectional view, the anchor is shown in two parts, one on each cavity wall. However, it will be appreciated that in the three-dimensional device, the anchors may be disposed in any arrangements, such that in some embodiments the anchor may be a single ring around the membrane such that the ring is either circular or polygonal in shape. In other embodiments the anchor may be a partial ring anchor, such that the ring does not extend around the entirety of the membrane. Or in other embodiments, there may be multiple separate anchors located around the membrane, such that there are sections of membrane which do not have an anchor at the edge. This may be advantageous to release pressure in the device. The sections of the perimeter of the membrane which are not fixed to the substrate by an anchor allow the pressure to be released when an acoustic wave passes through the cavity and impinges on the membrane. This pressure release decreases the likelihood of the membrane breaking due to stress. In all of the embodiments described, the bond pad may include an anchor to provide an electrical connection.

It will be appreciated that any number of anchors, or surface area of membrane covered by anchors, may be formed such that the membrane is fixed with sufficient strength to the substrate that the membrane does not break away from the substrate when acoustic pressure is exerted. The one or more anchors may be L-shaped, such that the anchor is in contact with both the substrate and the membrane. As shown in FIG. 2D, the anchor does not cover the entirety of the exposed portion of substrate, such that after the formation of the anchor, there is a remainder of exposed substrate at the outer edge of the front side of the device. The anchor may be formed in a number of ways, as will be described in detail herein.

FIGS. 3A-3D, 4, 5A-5D and 6 illustrate method steps of the general principles used to form and release a membrane in accordance with embodiments disclosed herein.

FIGS. 3A-3D show a cross-sectional view of the first steps of forming the membrane in accordance with the general principles according to embodiments disclosed herein.

FIG. 3A illustrates forming a sacrificial layer 305 on a substrate 301. The substrate is formed from silicon and is rectangular in the cross-sectional view. The substrate may be any shape in the plan view, such as circular or a polygonal shape. The substrate may be around 400 micrometers in thickness. The silicon is oxidized by thermal oxidation, such that a layer of silicon dioxide covers the front and back side of the substrate, and there is a front side sacrificial layer 305a and a back side sacrificial layer 305c. The silicon dioxide may be around 300 nanometers thick, on each of the front side and back side of the substrate, however, in some embodiments the silicon dioxide may be thicker or thinner.

FIG. 3B illustrates forming dimples 311 in the silicon dioxide layer 305a on the front side of the substrate. The dimples are formed to avoid sticking between two layers, and in this method the dimples will avoid sticking between the silicon dioxide layer and the membrane, whose formation will be described in the step of FIG. 3C. Without dimples, the membrane may fix to the substrate after its release, and result in intrinsic stress. The dimples 311 are formed by dry etching of the silicon dioxide layer 305a to around half of its depth, i.e., around 150 nm. The dimples may be etched in one or more places. It will be appreciated that FIG. 3B shows the etching of two sections of dimples, such that the sections of dimples are either side of the center of the silicon substrate, in the axis parallel to the surface of the substrate. It will be appreciated that in a three-dimensional substrate, the two sections of dimples as illustrated in FIG. 3B may be separate dimple sections located around the edge of the substrate, or they may both form part of the same ring of dimples which is continuous around the edge of the substrate.

FIG. 3C illustrates the deposition of a membrane 307 onto the substrate. The membrane may be deposited by physical vapor deposition or by any other suitable method. The membrane is deposited such that the dimples 311a are filled with membrane, and therefore the membrane comprises dimples 311b such that the indent of a dimple on the silicon dioxide is the equal size and shape to a corresponding protrusion of a dimple on the deposited membrane.

FIG. 3D illustrates a more detailed view of the membrane 307. As illustrated, the membrane comprises two piezoelectric film layers 321a and 321b, three electrodes 325a, 325b, and 325c, two bond pads 327, and a passivation layer 323. The bond pads 327 are each in contact with an electrode. The electrodes 325a, 325b, and 325c may be formed from any conductive material, such as molybdenum. The passivation layer 323 may be aluminum nitride.

The layers of electrode material and piezoelectric material are deposited such that they are alternating. Lower layer of electrode 325a is deposited first, such that it is in contact with the silicon dioxide layer on the front side of the substrate 305a. The layers of electrode and piezoelectric material may be deposited by physical vapor deposition. The passivation layer is deposited after the upper electrode 325b has been deposited, such that the passivation layer is in contact with the surroundings, thus protecting the electrodes and piezoelectric film layers.

As illustrated in FIG. 3D, the electrodes do not cover the entirety of the piezoelectric film layers 321a and 321b. The electrodes collect charge created from stress and strain of the piezoelectric film layers, due to the piezoelectric effect, and therefore the electrodes have been placed at locations at which the stress and strain on the membrane of the final device is the largest per unit area. Therefore, the electrodes have been placed at what will be the center of the membrane, and at what will be the edge of the cavity of the final device, adjacent the anchor region, as will be shown herein in the microphone. The electrode at the center of the membrane is herein referred to as the inner electrode, and the electrode adjacent the anchor region is referred to as the outer electrode. The edge of the membrane overlaps the substrate walls, and the membrane is not under stress or strain at this region, and therefore the electrodes are not located at the edge of the membrane. However, in some embodiments, the electrodes may cover the entire membrane, such that there is no inner or outer electrode. Or, in other embodiments, there may only be electrodes positioned at the center of the membrane, or only positioned adjacent the anchor region. It will be appreciated that in some embodiments, the membrane may comprise one, or three piezoelectric film layers, and the membrane may comprise two electrodes.

Figure 4:
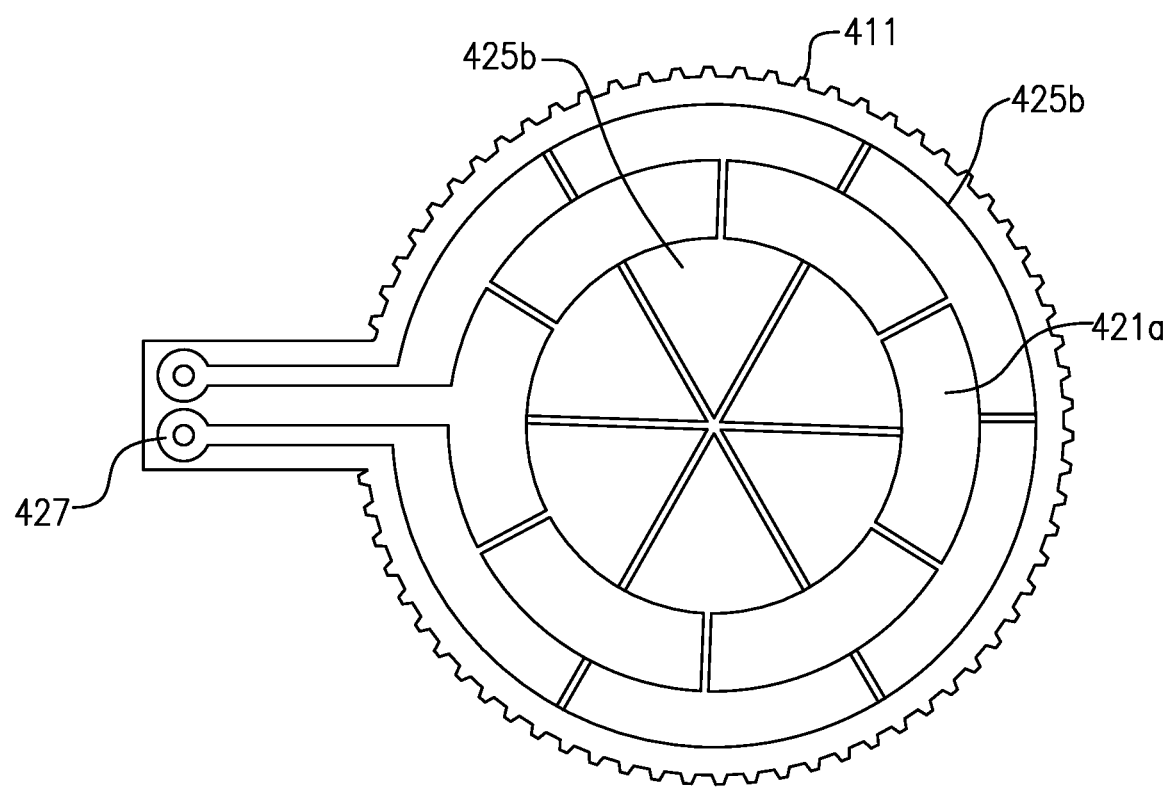
FIG. 4 shows a plan view of a microphone with a membrane according to aspects of the present invention.

FIG. 4 shows a plan view of the arrangement of FIG. 3D, following the step of depositing the membrane onto the substrate. As shown, the membrane is substantially circular. In the plan view, the upper electrodes 425b is shown, and the exposed piezoelectric film layer 421a is shown underneath. As described, the electrodes 425b are located at the center of the membrane, and adjacent the anchor region. The inner and outer electrodes are linked, as shown in FIG. 4. The electrodes may be split into sections, as shown in FIG. 4. The multiple sections of electrodes can be connected in series and/or in parallel to achieve the desired capacitance value of the microphone. FIG. 4 also shows the bond pads 427 connected to the electrodes.

FIGS. 5A-5F illustrate cross-sectional views of steps of the general principles for releasing the membrane in accordance with embodiments disclosed herein. It will be appreciated that these steps follow on directly from the steps shown in FIGS. 3A-3D.

Figure 5A:
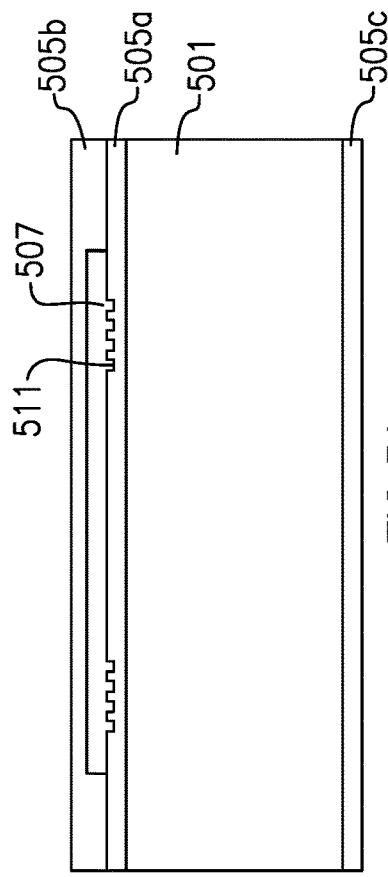
FIGS. 5A-5F show cross-sectional views of steps of releasing a membrane according to aspects disclosed herein.

As illustrated in FIG. 5A, a second sacrificial layer 505b is deposited to cover the membrane and the exposed first sacrificial layer 505a. The second sacrificial layer 505b is composed of silicon dioxide. The second sacrificial layer is at least around 0.5 micrometers thick to provide sufficient coverage of the membrane 507. The second sacrificial layer may be deposited in any suitable way, such as by any method of deposition described herein.

Figure 5B:
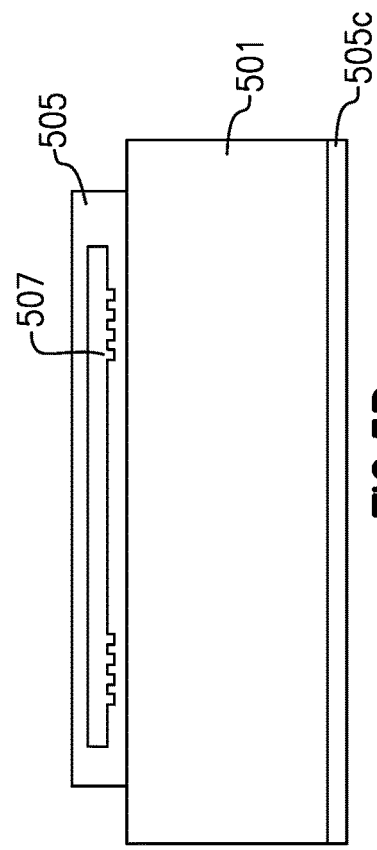

As illustrated in FIG. 5B, the first and second sacrificial layers, referred to in the following discussion as a single sacrificial layer 505 for clarity, are etched at the sides of the substrate, as shown in the cross-sectional view of FIG. 5B. The sides of the substrate are etched such that there is still sufficient silicon dioxide covering the side of the membrane. Following the removal of the silicon dioxide at the edge of the substrate, there is an exposed section of silicon substrate around the edge of the front side of the silicon substrate. The sacrificial layer is etched by a dry etch, which removes the silicon dioxide without removing silicon substrate. The dry etch results in an etch which is substantially 90 degrees to the surface of the substrate. Any suitable etching method may be used to dry etch the silicon dioxide.

Figure 5C:
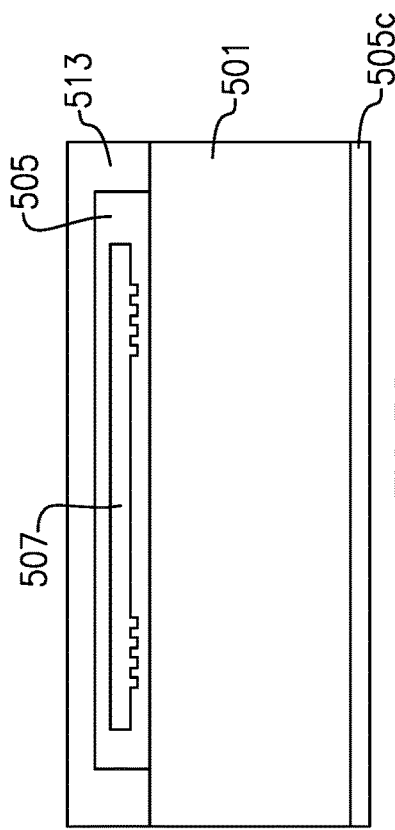

FIG. 5C illustrates the next step of depositing a polysilicon layer 513 on the remaining sacrificial layer 505 and the exposed silicon substrate. This results in the entire silicon dioxide sacrificial layer 505 being covered in a polysilicon layer. The polysilicon may be at least around 2 micrometers thick.

Figure 5D:
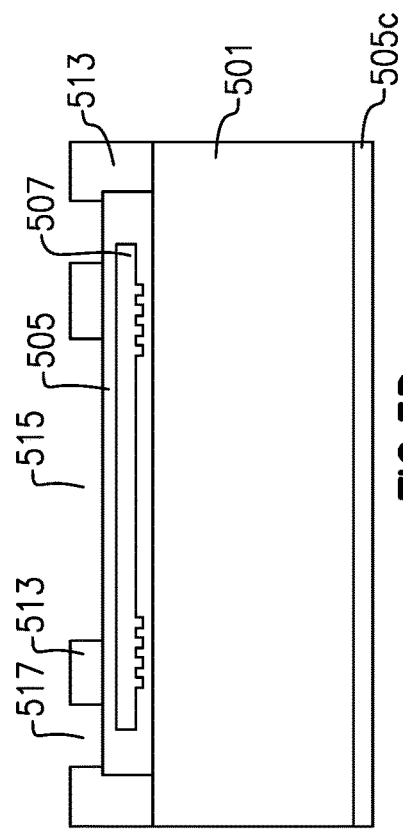

FIG. 5D illustrates the next step of etching the polysilicon layer 513 by dry etching. Any suitable process may be used to dry etch the polysilicon. The etching process is sufficient that in the sections etched, the polysilicon layer is removed throughout its depth. The etching process does not remove the silicon dioxide layer. The polysilicon is etched in sections such that at least one pocket is formed around the edge of the silicon dioxide layer, and a sound port 515 is created at the center of the silicon dioxide layer. The polysilicon is etched to form pockets 517 which are sufficiently wide that an anchor may be formed within each of the pockets in the following steps. It will be appreciated that in an embodiment in which more than one pocket is formed, one or more anchors may be formed. Pockets which are insufficient in size would result in an anchor which does not cover a sufficient portion of the membrane and substrate to anchor the membrane to the substrate. The pockets are therefore located such that following the removal of the sacrificial layer, they will cover a portion of the membrane, and they will also cover a section of the substrate. Therefore, the pocket overlaps with both a portion of the membrane, and a portion of substrate on which there is no membrane located.

Figure 5F:
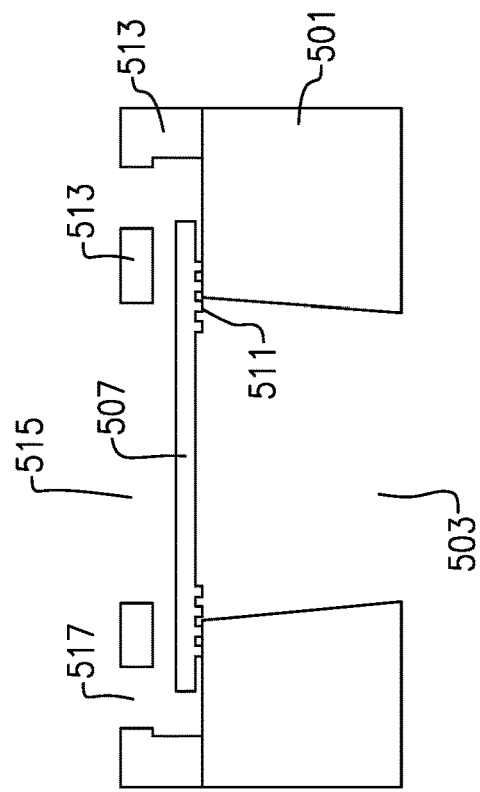
Figure 5E:
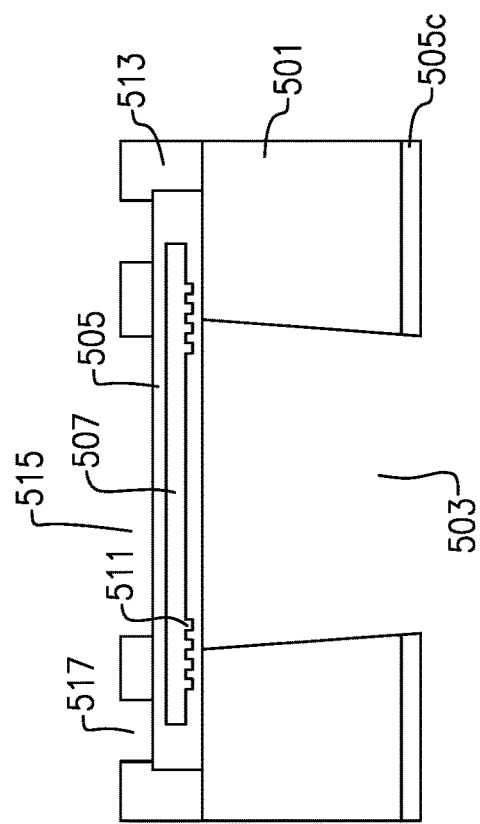

FIG. 5E illustrates the next step of etching a cavity in the substrate 501. Firstly, the silicon dioxide layer 505c on the back side of the cavity is etched, which may be done by anisotropic etching. This exposes silicon substrate at the back side of the substrate. Secondly, a cavity is defined by etching the silicon substrate from the back side of the device using a silicon etch where exposed silicon substrate has been exposed to form substrate walls and the cavity. The silicon substrate and silicon dioxide layers may be etched in two separate steps, as the silicon substrate may be around 400 micrometers thick, whereas the silicon dioxide may be less than 1 micrometer thick, for example, around 400 nanometers thick. Therefore, different tools may be used to etch these materials due to their difference in thicknesses, and the two different materials are etched in two steps. The cavity is herein defined at the space between the substrate walls. In three dimensions, it will be appreciated that the cavity may be any shape, such as circular or rectangular or shaped as another polygon. In some embodiments there may be four substrate walls, each meeting at a right angle, such that a polygonal cavity 503 is defined. In other embodiments the cavity may be circular, in which case there may be one surrounding wall around the cavity, such that the wall may be circular. It will be appreciated that in a cross-sectional view, two cavity walls are shown, although these may comprise the same circular cavity wall. The etch used to etch the substrate to define a cavity may be an anisotropic etch, such as a deep reactive ion etch (DRIE). The substrate walls are illustrated as slanted, as the DRIE process may create such slanted walls. However, it will be noted that the walls may be vertically straight or slanted in any of the embodiments described herein. The etchant is such that the silicon dioxide of the sacrificial layer 505 on the front side of the substrate is not removed from the underside of the cavity. The cavity is defined by etching the entire depth of the silicon substrate, such that the etching stops at the sacrificial layer. The silicon substrate 501 is etched at a width such that substrate walls are formed, and the substrate walls are positioned such that they support the edge of the membrane once the sacrificial layer has been removed as shown in FIG. 5F.

FIG. 5F illustrates the removal of the sacrificial layers 505 such that the membrane 507 is released. The sacrificial layer is removed by vapor HF or other wet etching methods which removes the sacrificial layer without etching the membrane, silicon substrate, or polysilicon layer. The membrane is released by the removal of the silicon dioxide sacrificial layer, and is a free membrane. As the membrane is not fixed to the substrate, it is able to expand or contract freely to release its residual stress. The membrane rests on the substrate, such that its dimples 511 contact the substrate 502. However, it will be noted that in some embodiments, the cavity may be wider, or the membrane shorter, such that the section of the membrane that rests on the substrate walls is the flat edge of the membrane, outside the dimple region. The silicon dioxide layer 505c on the back side of the substrate is also removed by vapor HF.

Figure 6:
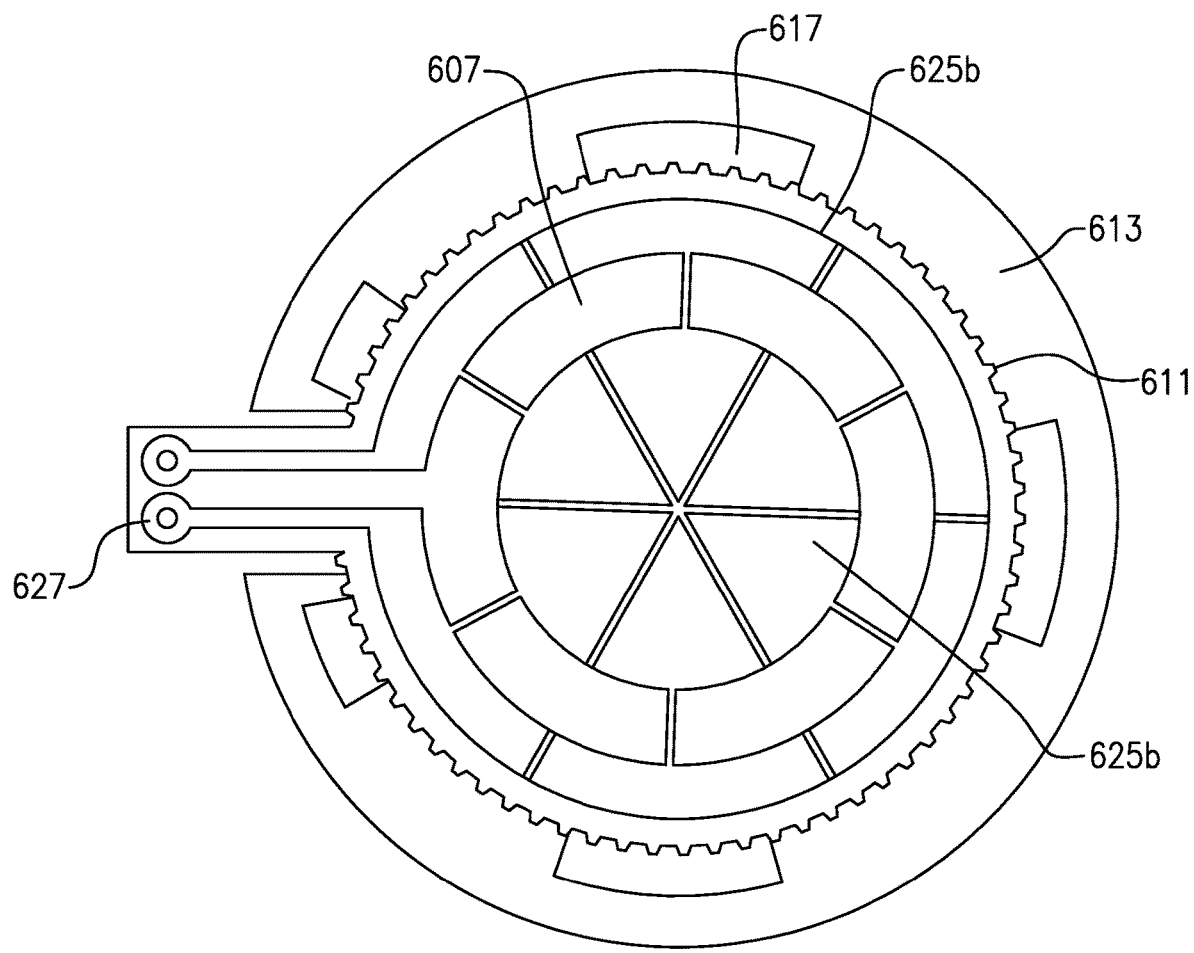
FIG. 6 shows a plan view of a microphone with a released membrane according to aspects disclosed herein.

FIG. 6 shows a plan view of the arrangement following the step as described in relation to FIG. 5F. As shown, the membrane 607 and cavity are circular. Therefore, the polysilicon sections 613, pockets 617, and sound port are circular in shape, as shown in FIG. 6. As described in relation to FIG. 4 the upper electrode 425b is shown in FIG. 6, and the upper electrode is split into sections and inner and outer electrodes, and the membrane is 607 is also shown on the sections not covered by an electrode. As shown in FIG. 6, the pockets may not extend the entirety of the perimeter of the membrane, such that there are sections of the perimeter wherein there is no pocket, and sections at which there is a pocket. The pockets may be any size, such that they may extend across any diameter of the membrane. For example, although the arrangement is shown as comprising five pockets, wherein the two pockets adjacent the bond pads, are smaller than the three other pockets, the five pockets may all be equal size. In other embodiments, there may be more or fewer pockets etched into the polysilicon layer. In other embodiments there may be one single pocket extending the entire circumference of the membrane, or one single pocket extending partially around the entire circumference of the membrane.

It has been appreciated, that following the steps of the general principles as described in FIGS. 3A-3D, 4, 5A-5D, and 6, results in a membrane which is free of residual stress, in accordance the disclosed embodiments. With residual stress removed, the performance of microphones can be preserved and sensitivity variation can be minimized so that the yield of manufacturing can be significantly improved, reducing the cost of mass production. However, it has been appreciated that the membrane is fixed to the substrate, and therefore the method of manufacturing the microphone further comprises forming an anchor to fix the membrane to the substrate.

We will now describe four embodiments that uses the principles for releasing a membrane as described above. Each of the methods is described in FIGS. 7A-7G, 8A-8B, 9A-9C, and 10A-10C. Any of the four methods for forming an anchor may be used in conjunction with any of the techniques for releasing the membrane as described herein.

Figure 7A:
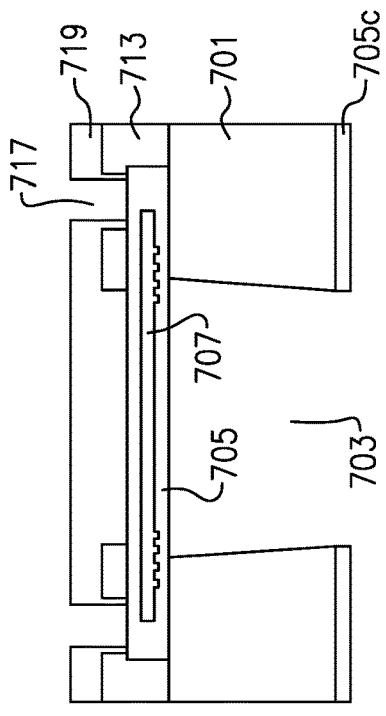
FIGS. 7A-7G show cross-sectional and plan views of steps of forming an anchor according to aspects disclosed herein.

FIGS. 7A-7G illustrate a first method of forming the at least one anchors, to be used in conjunction with any of the techniques for forming the membrane as described herein. It will be appreciated that this method is carried out on an unreleased membrane, such that the method described in relation to FIGS. 7A-7G follow the steps as described in FIGS. 3A-3D, 4, 5A-5D, and 6, except that the cavity has not been defined by etching the substrate, as described in FIG. 5E, nor has the sacrificial layer 505 been removed, as described in FIG. 5F. Instead, the step of releasing the membrane is a step within the process as described in FIGS. 7A-7G. Therefore, as shown in FIG. 7A, a photoresist layer 719 is deposited to cover the section of sacrificial layer exposed by the pockets 717 and the remaining polysilicon layer 713 following the etching of polysilicon layer to create the pockets 717.

Figure 7B:
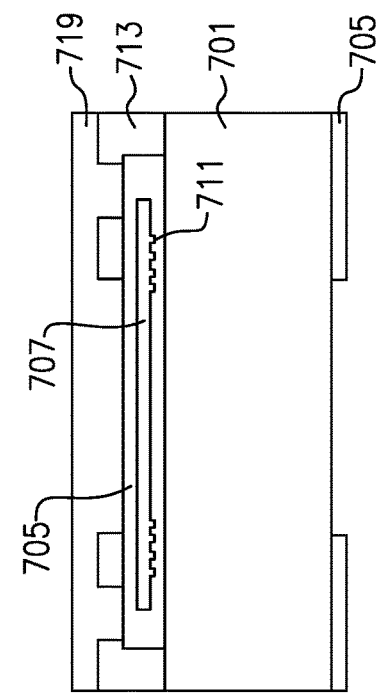

FIG. 7B shows the patterning of the photoresist layer, to substantially remove the photoresist layer from the pockets 717. The photoresist layer may be patterned by any suitable method, such as exposing the layer to light. The photoresist layer is patterned such that the polysilicon layer remains covered by a thin layer of photoresist layer, and the entire thickness of the photoresist layer is removed at the sections patterned. A sufficient amount of light is therefore used to achieve this depth of patterning. The silicon dioxide is not patterned or etched as a result of this patterning.

Figure 7C:
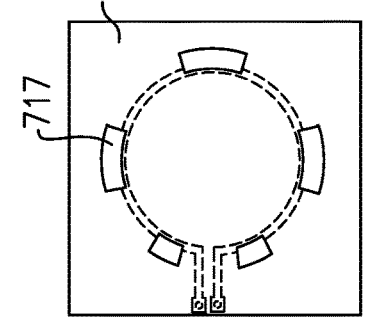

FIG. 7C shows a plan view of the method of FIG. 7B, showing the pockets. As shown, pockets 717 are patterned in the photoresist layer to correspond to the pockets formed in the polysilicon layer, shown in the plan view of FIG. 6. The remainder of the membrane and bond pads are covered by the photoresist layer. It will be appreciated that although FIG. 7C is shown as having a photoresist layer, this is for illustrative purposes only, and solely needs to be larger in area than the substrate, such that the entirety of the features of the arrangement are covered by photoresist layer before patterning.

Figure 7D:
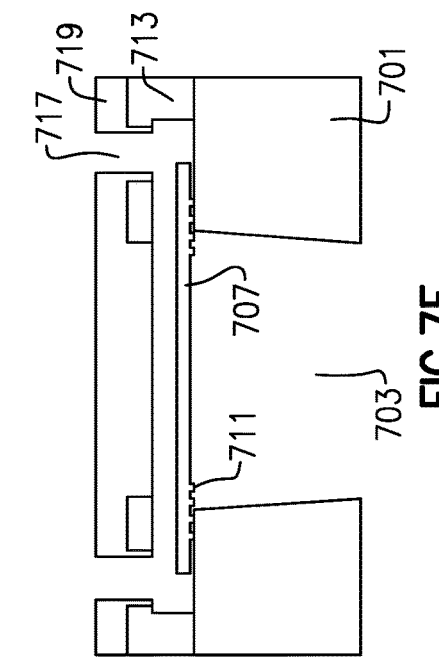

FIG. 7D shows a cross-sectional view of next step of the method, in which the substrate is etched from the back side to define a cavity. In this method, the silicon dioxide layer 705*c* has been removed as described in the method of FIG. 5E herein. The etching of the substrate to define a cavity is as described in relation to FIG. 5E, and the reader is directed to the discussion in relation to FIG. 5E to describe this step.

Figure 7E:
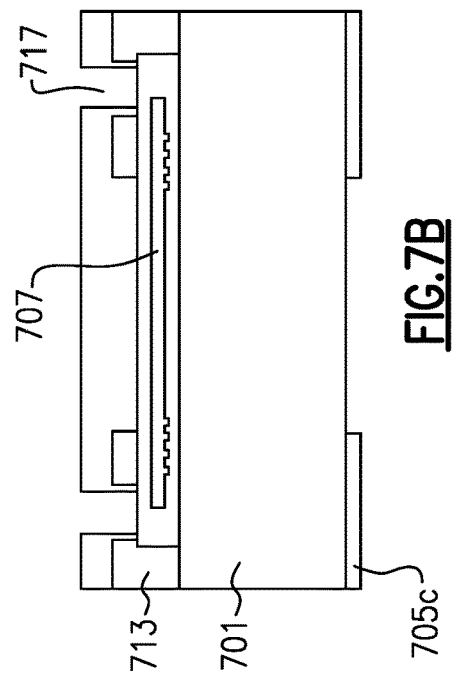

FIG. 7E shows the removal of the silicon dioxide layers 705 and 705*c*, such that the membrane 707 is released. The sacrificial layer is removed by vapor HF which removes the sacrificial layer without etching the membrane, silicon substrate, or polysilicon layer. The membrane is released by the removal of the silicon dioxide sacrificial layer, and is a free membrane. As the membrane is not fixed to the substrate, it is able to expand or contract freely to release its residual stress. The membrane rests on the substrate, such that its dimples 711 contact the substrate 702. However, it will be noted that in some embodiments, the cavity may be wider, or the membrane shorter, such that the section of the membrane that rests on the substrate walls is the flat edge of the membrane, outside the dimple region. The silicon dioxide layer 705*c* on the back side of the substrate is also removed by vapor HF. It will be appreciated that the silicon dioxide layers may be removed either from the front side, back side, or from both sides of the substrate.

Figure 7G:
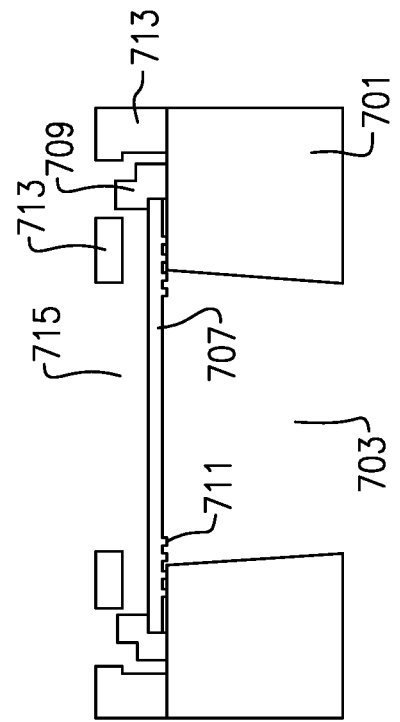
Figure 7F:
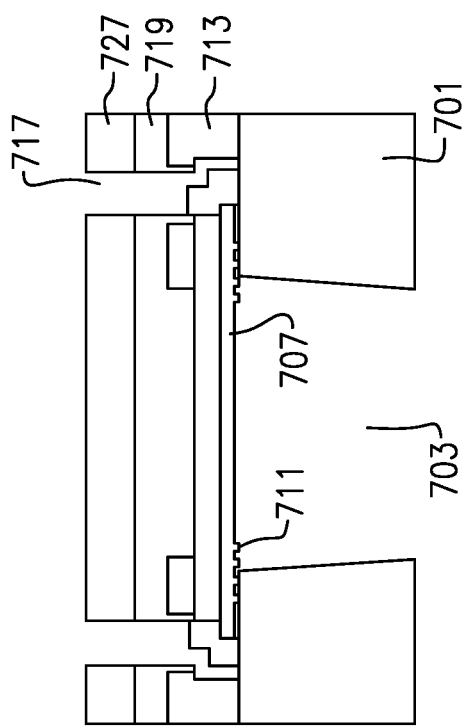

FIG. 7F shows a cross-sectional view of depositing a layer of metal 709 onto the remaining sections of photoresist layer, and onto the section of membrane and substrate exposed by the patterning of the pockets 717 in the photoresist layer. The metal therefore is in contact with the membrane 707 and the substrate 701, such that it forms an anchor to fix the membrane to the substrate. The metal may be deposited by metal evaporation which may be performed at a low temperature, preferably with substrate cooling to reduce the temperature of the substrate. An example of substrate cooling is to use water cooling, such that water runs underneath the substrate, and thus cools the substrate. Any suitable metal may be used, such as aluminum, gold, or other metal which is able to be deposited at a low temperature. It will be noted that a non-metallic material may be deposited instead, provided that it may be deposited at a low temperature. The low temperature is preferable so that the released membrane does not incur stress due to thermal changes, which would degrade the performance of the microphone. Preferably, a material with a higher flexibility forms the anchor when higher temperatures are used to deposit the anchor. The membrane may deform with an increase in temperature, therefore a flexible anchor can be applied to the deformed membrane and reduce the intrinsic stress when the membrane has returned to its original shape when cooled.

FIG. 7G shows the removal of the photoresist layer and thus the metal deposited on the photoresist layer. The photoresist layer may be removed by any suitable method, such as being exposed to a light source. The resultant device therefore comprises a metal anchor, 709, fixing the membrane 707 to the substrate walls.

Figure 8B:
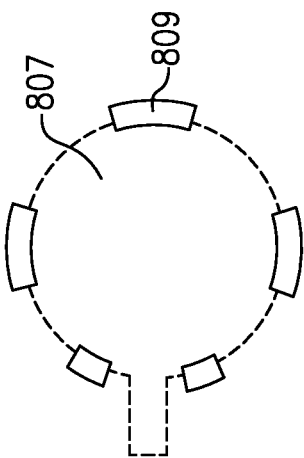
FIGS. 8A-8B show cross-sectional and plan views of steps of forming an anchor according to aspects disclosed herein.
Figure 8A:
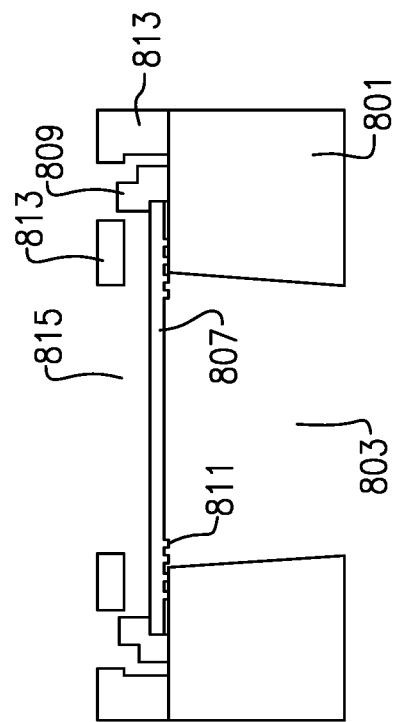

FIGS. 8A-8B show a second embodiment of forming the at least one anchors to be used in conjunction with any of the techniques for releasing the membrane as described herein, such as those shown in FIG. 2A-2D or 3A-3D, 4, 5A-5D, and 6. In this embodiment, the method is described in relation to a membrane that has already been released such as using the method step of removing the sacrificial layer as described in FIG. 5F. The step illustrated in FIG. 8A comprises selectively depositing a material into the pockets, formed in the polysilicon layer, such that the material is in contact with both the membrane and the substrate and thus forms an anchor. The material may be metal, or another suitable material. The material is deposited by using high precision dispensers, or 3D printers, such that the material covers selective areas, and there is no need to remove any excess material from the arrangement after this step.

FIG. 8B shows a plan view of the method of FIG. 8A. As shown, the anchors are formed in the same arrangement as the pockets are etched into the polysilicon layer. As described for the etching of the polysilicon, described herein in relation to FIG. 6, the pockets, and thus the anchors may be formed in any suitable arrangement, such that they cover more or less of the edge of the membrane.

FIG. 9A shows a third embodiment of forming the at least one anchors to be used in conjunction with any of the techniques for releasing the membrane as described herein, such as those shown in FIG. 2A-2D or 3A-3D, 4, 5A-5D, and 6. In this embodiment, the method is described in relation to a membrane that has already been released such as using the method step of removing the sacrificial layer as described in FIG. 5F.

FIG. 9A illustrates the bonding of a wafer 929 onto the remaining polysilicon 913. The wafer may be composed of any suitable material, such as silicon or glass. Preferably the wafer is a silicon wafer which is around 300-500 micrometers thick. The wafer is shaped such that it comprises posts which are aligned with the outer edge of the remaining polysilicon layer, and the silicon substrate. The posts are shaped such that away from the wafer edges, the wafer is not in contact with the polysilicon layer. Therefore, the wafer is solely bonded to the polysilicon layer via its posts. The wafer further comprises pockets that correspond and align with the pockets 917 of the polysilicon layer. The wafer is bonded to the polysilicon layer at low temperatures, such that the released and stress-free membrane does not incur additional stress by thermal changes.

FIG. 9B shows a cross-sectional view of depositing a layer of metal 927 onto the wafer, and onto the section of membrane and substrate exposed by the pockets 917 in the polysilicon layer, and the pockets in the wafer. The metal therefore is in contact with the membrane 907 and the substrate 901, such that it forms an anchor to fix the membrane to the substrate. The metal may be deposited by metal evaporation which may be performed at a low temperature, preferably with substrate cooling. Any suitable method may be used, such as aluminum, gold, or other metal which is able to be deposited at a low temperature. It will be noted that a non-metallic material may be deposited instead, provided that it may be deposited at a low temperature. The low temperature is preferable so that the released membrane does not incur stress due to thermal changes, which would degrade the performance of the microphone.

FIG. 9C shows the removal of the wafer and thus the metal deposited wafer. The wafer may be removed by any suitable method, such as by using heat, using laser or using mechanical splitting. The resultant device therefore comprises a metal anchor, 909, which fixes the membrane 907 to the substrate walls.

Figure 10A:
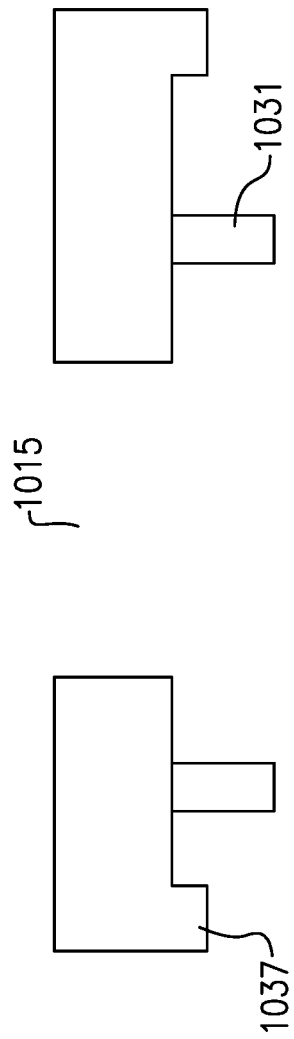
FIGS. 10A-10B show cross-sectional views of steps of forming an anchor according to aspects disclosed herein.
Figure 10B:
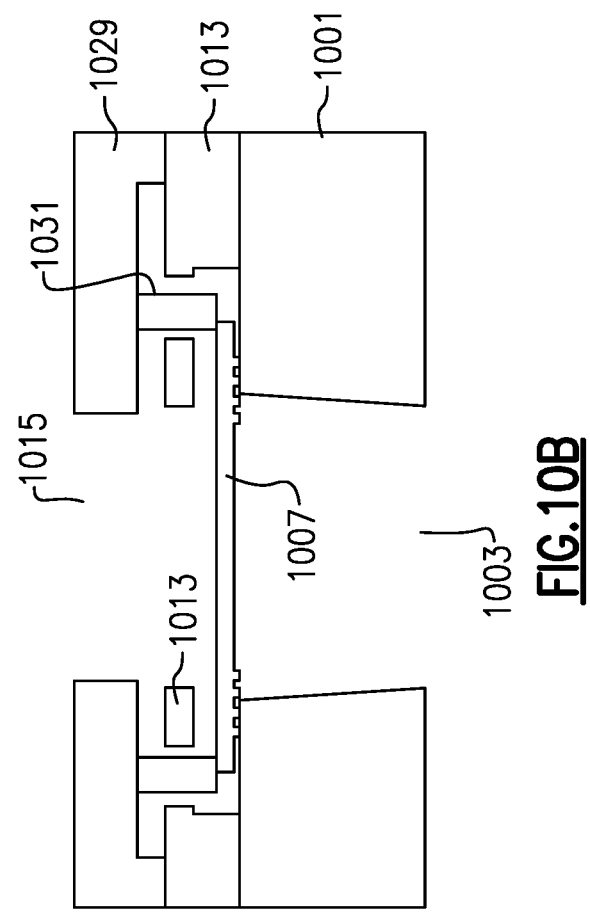

FIGS. 10A-10B show a fourth embodiment of forming the at least one anchors to be used in conjunction with any of the techniques for releasing the membrane as described herein, such as those shown in FIG. 2A-2D or 3A-3D, 4, 5A-5D, and 6. In this embodiment, the method is described in relation to a membrane that has already been released such as using the method step of removing the sacrificial layer as described in FIG. 5F. FIG. 10A shows a cap wafer, similar to that described in FIGS. 9A-9C. The cap wafer may be a silicon wafer which is around 300-500 micrometers thick. The cap wafer of the method of FIGS. 10A-10B comprises at least one stopper 1031 formed on the cap wafer, such that it extends perpendicular from the surface of the wafer. The stopper may be formed from any material, but preferably a soft material. For example, the wafer may be comprised from a polymer such as Polydimethylsiloxane (PDMS) or Poly(methyl methacrylate) (PMMA) or SU8 or others. The cap wafer comprises a sound port 1015 located in the middle of the cap wafer, whose width corresponds to the width of the cavity at its opening on the front side of the cavity. The cap further comprises a post 1037 adjacent to the stopper 1031, such that the posts 1037 are aligned with the outer edge of the remaining polysilicon layer 1013, and the silicon substrate. The posts are shaped relative to the wafer such that away from the wafers edges, the wafer is not in contact with the polysilicon layer. The stoppers are positioned relative to the posts, such that the stopper is not in contact with the posts. Therefore, the wafer is solely bonded to the polysilicon layer via its posts 1037. The wafer is bonded to the polysilicon layer at low temperatures, such that the released and stress-free membrane does not incur additional stress by thermal changes.

FIG. 10B shows a cross-sectional view of the cap wafer 1029 bonded to the polysilicon layer. As shown, the at least one post is bonded such that the outer edge of the cap wafer is in line with the outer edge of the polysilicon layer, and the outer edge of the silicon substrate. The one or more stoppers are positioned such that they extend from the cap wafer towards the membrane, passing through the pockets in the polysilicon layer. It will be noted that the one or more stoppers 1031 are bonded to the cap wafer 1029 such that the one or more stoppers 1031 are in contact with the membrane 1007 when the cap wafer is bonded to the polysilicon layer. The stoppers are formed of a length such that they apply sufficient pressure to the membrane to hold the membrane to the substrate when the membrane bends due to acoustic pressure.

Figure 11:
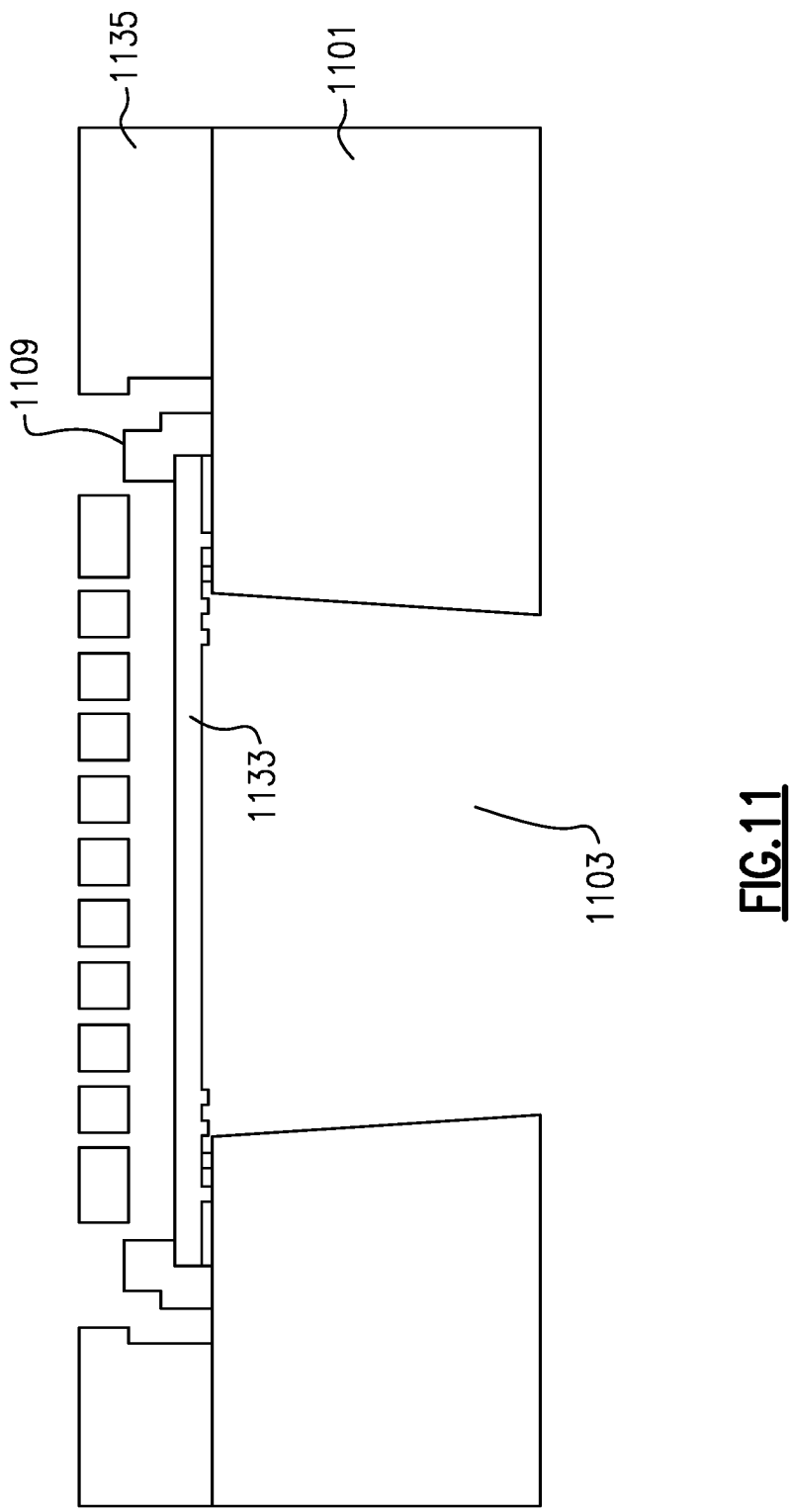
FIG. 11 shows a cross-sectional view of a capacitive MEMS microphone according to aspects disclosed herein.

It will be noted, that although the methods and embodiments described above are related to piezoelectric MEMS microphones, these methods may be applied to capacitive MEMS microphone. FIG. 11 illustrates an embodiment in which at least one anchor 1109 has been applied to a released capacitive membrane 1133. The method is as described in any of the embodiments above, except the membrane 1133 is composed of non-piezoelectric layers, and the forming of the sound port creates multiple gaps in the polysilicon layer 1135 such that the remaining polysilicon layer forms the backplate, wherein the gaps are vent holes. The capacitive membrane is released in the same way as any of the methods described above to remove the intrinsic stress. The anchor 1109 may be formed by any of the methods described above. The other features of the microphone, such as the cavity 1103, may be formed by any of the methods described above.

Figure 12:
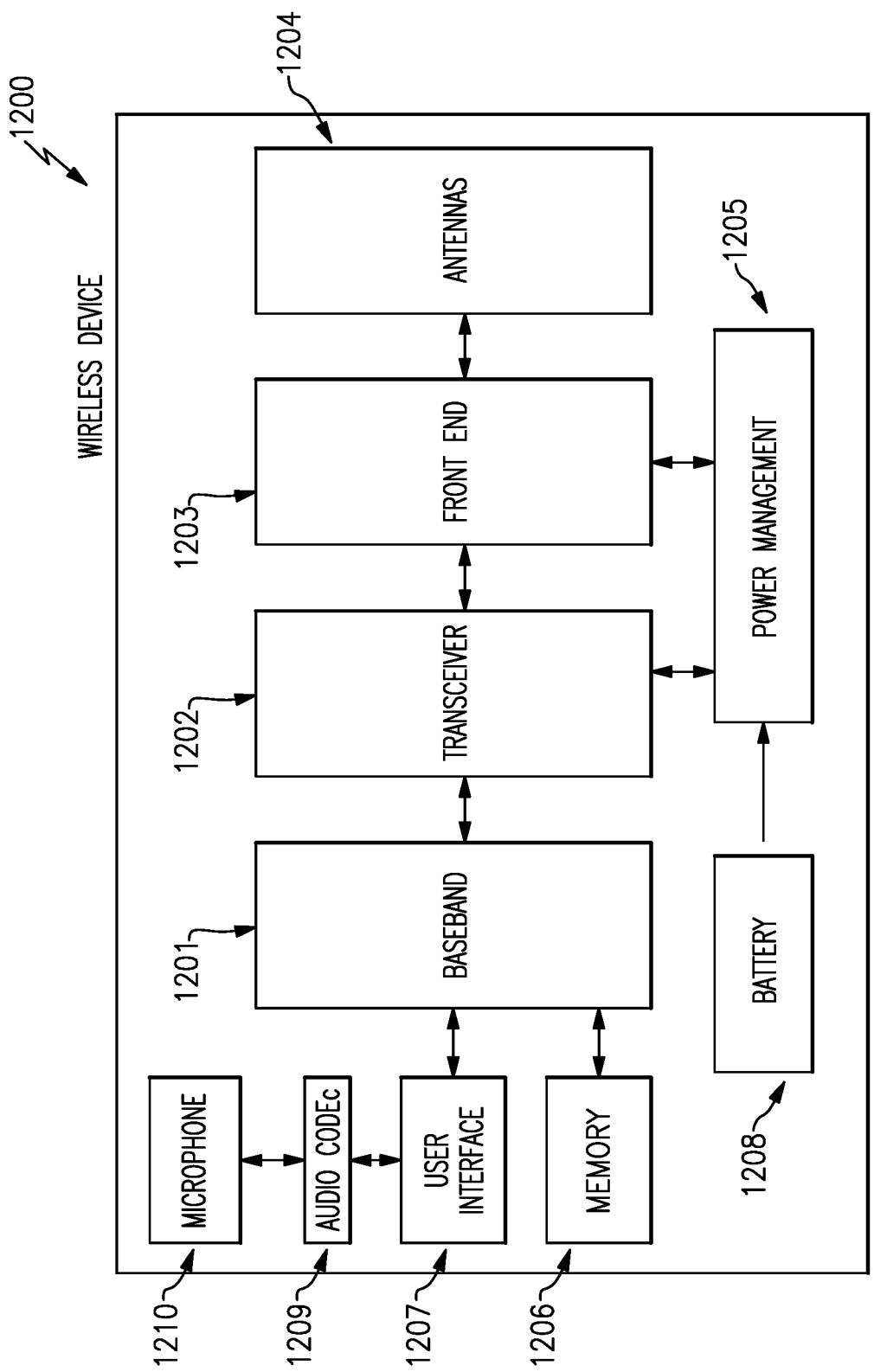
FIG. 12 shows a schematic view of a device in accordance with aspects disclosed herein.

FIG. 12 is a schematic diagram of one embodiment of a wireless device 1200. The wireless device can be, for example but not limited to, a portable telecommunication device such as, a mobile cellular-type telephone. The wireless device includes a microphone arrangement 1210, including an improved microphone as described herein in relation to FIGS. 2 to 11, and may include one or more of a baseband system 1201, a transceiver 1202, a front end system 1203, one or more antennas 1204, a power management system 1205, a memory 1206, a user interface 1207, a battery 1208, and audio codec 1209. The microphone arrangement may supply signals to the audio codec 1209 which may encode analog audio as digital signals or decode digital signals to analog. The audio codec 1209 may transmit the signals to a user interface 1207. The user interface 1207 transmits signals to the baseband system 1201. The transceiver 1202 generates RF signals for transmission and processes incoming RF signals received from the antennas.

The transceiver 1202 aids in conditioning signals transmitted to and/or received from the antennas 1204.

The antennas 1204 can include antennas used for a wide variety of types of communications. For example, the antennas 1204 can include antennas 1204 for transmitting and/or receiving signals associated with a wide variety of frequencies and communications standards.

The baseband system 1201 is coupled to the user interface to facilitate processing of various user input and output, such as voice and data. The baseband system 1201 provides the transceiver 1202 with digital representations of transmit signals, which the transceiver 1202 processes to generate RF signals for transmission. The baseband system 1201 also processes digital representations of received signals provided by the transceiver 1202. As shown in FIG. 12, the baseband system 1201 is coupled to the memory to facilitate operation of the wireless device.

The memory can be used for a wide variety of purposes, such as storing data and/or instructions to facilitate the operation of the wireless device and/or to provide storage of user information.

The power management system 1205 provides a number of power management functions of the wireless device.

The power management system 1205 receives a battery voltage from the battery 1208. The battery 1208 can be any suitable battery for use in the wireless device, including, for example, a lithium-ion battery.

Figure 13:
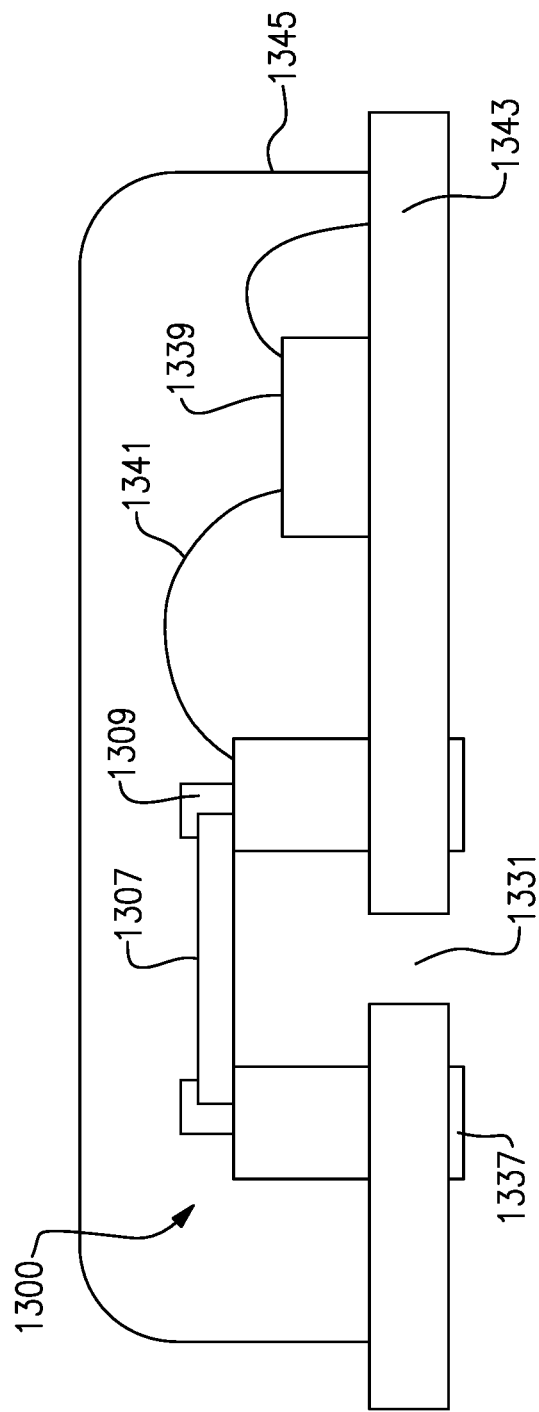
FIG. 13 shows a packaged microphone in accordance with aspects disclosed herein.

FIG. 13 illustrates a cross-sectional view of a microphone arrangement. It will be appreciated that this is an example embodiment for illustrative purposes, and the microphone can be included in a variety of different arrangements. As illustrated, the microphone 1300 of FIG. 13 is located within a cap 1345. The microphone 1300 may be the microphone of any embodiments described herein. As shown, the microphone comprises a released membrane and at least one anchor fixing the membrane to the substrate, as described herein. The cap may be flexible or rigid, and may be any suitable material such as a metallic material. The cap creates a seal with a substrate 1343 (for example a printed circuit board), such that air only flows into and out of the arrangement via a sound inlet 1331. The substrate 1343 may be any suitable material. The cap 1345 also mitigates electromagnetic interference. Sound waves enter the arrangement, causing the membrane 1307 to bend and produce voltage, as described herein. The arrangement comprises at least one solder pad 1337 such that the microphone arrangement may be soldered to external devices, not shown here. The microphone arrangement further comprises an application specific integrated circuit chip/die ("ASIC") 1339. The MEMS microphone is electrically connected by wire bonding 1341. Although not shown, it will be appreciated that the wire bonding may be connected to the one or more electrodes of the microphone, as described herein.

It will be noted that FIG. 13 is a cross-sectional view of the microphone arrangement, such that the one or more solder pads, substrate 1343, MEMS microphone 1300, ASIC 1339, and cap 1345 extend into the page such that they are three-dimensional, as described in relation to other embodiments disclosed herein.

Figure 14:
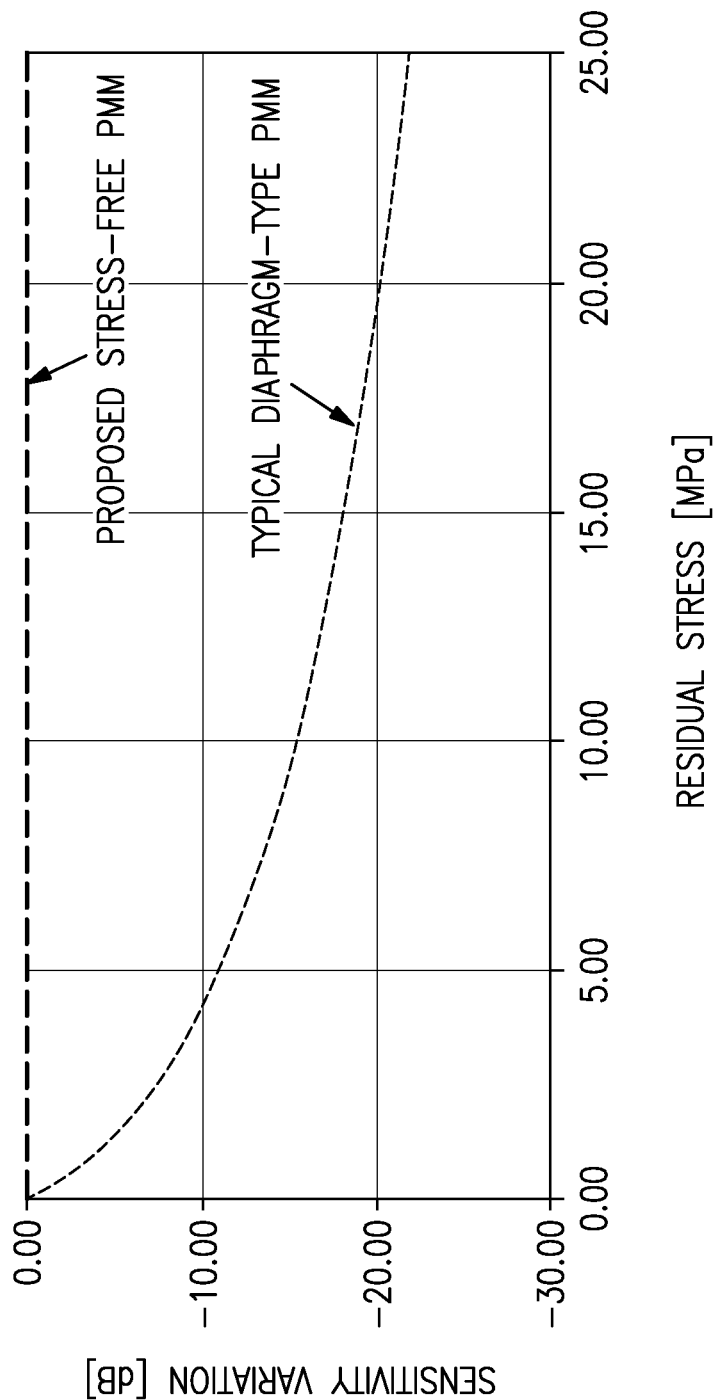
FIG. 14 shows a graph of the performance of a microphone in accordance with aspects disclosed herein.

FIG. 14 compares the sensitivity variation of the device in dB with change in residual stress of the membrane in MPa. As shown, in a typical diaphragm-type piezoelectric MEMS microphone, the increase in residual stress results in a decrease in sensitivity of the microphone. This is because the output energy of the microphone, due to piezoelectric effect is reduced when a static deflection of the diaphragm is caused by the residual stress. For example, in a microphone whose membrane has a residual stress of 0 MPa, the sensitivity variation in the microphone is around 0 dB, as shown in FIG. 14. Whereas, in a microphone whose membrane has a residual stress of 10 MPa, the sensitivity variation in the microphone is around 15 dB, as also shown in FIG. 14. Residual stress may therefore result in failed devices, and therefore due to the manufacturing intolerances, the yield of microphones is decreased. FIG. 14 also illustrates the sensitivity of a microphone manufactured according to embodiments disclosed herein. As shown, the residual stress in the manufactured membrane does not affect the sensitivity of the microphone, as the residual stress is released during the method of manufacturing the microphone, as described in the methods herein. Therefore, the embodiments disclosed herein result in a microphone with an improved sensitivity, and increased yield, which therefore results in lower costs of manufacture.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method for manufacturing a microelectromechanical systems (MEMS) microphone, comprising:
depositing a membrane on a first sacrificial layer, wherein the first sacrificial layer is deposited on a substrate;
etching the substrate to define a cavity;
releasing the membrane by removing at least the first sacrificial layer; and
forming at least one anchor at an edge of the membrane;
depositing a second sacrificial layer on top of the deposited membrane, the first and second sacrificial layers forming a single sacrificial layer;
dry etching the single sacrificial layer at the edge of the membrane;
depositing a layer of polysilicon on the single sacrificial layer; and
etching areas of the polysilicon layer such that there is at least one section of polysilicon layer remaining and at least one section of the single sacrificial layer is exposed.

2. The method of claim 1 further comprising:
depositing a photoresist layer on the remaining polysilicon layer and exposed single sacrificial layer;
etching the photoresist layer to provide one or more etched areas and expose the single sacrificial layer;
removing the single sacrificial layer via the one or more etched areas to release the membrane; and
placing at least one anchor through the one or more etched areas such that the at least one anchor is in contact with the membrane.

3. The method of claim 1 wherein removing the sacrificial layer comprises etching by vapor Hydrofluoric acid.

4. The method of claim 1 wherein depositing the membrane on a sacrificial layer comprises:
depositing at least one layer of metal; and
depositing at least one layer of piezoelectric material, such that the layers of metal and piezoelectric material are alternated.

5. A microelectromechanical systems (MEMS) microphone, comprising:
a substrate including at least one wall defining a cavity;
a membrane supported by the at least one wall; and
at least one anchor in contact with the membrane and the at least one wall, such that the membrane is only fixed to the at least one wall by the at least one anchor, wherein the anchor is formed from metal.

6. The microelectromechanical systems microphone of claim 5 wherein the anchor is formed after the membrane has been released.

7. The microelectromechanical systems microphone of claim 5 wherein the anchor is formed from at least one stopper.

8. The microelectromechanical systems microphone of claim 7 wherein the microphone further comprises a cap wafer attached to the at least one stopper.

9. The microelectromechanical systems microphone of claim 5 wherein the microphone comprises an additional one or more anchors.

10. The microelectromechanical systems microphone of claim 5 wherein the anchor is formed by a material deposited after the membrane.

11. The microelectromechanical systems microphone of claim 5 wherein the anchor comprises a photoresist layer.

12. The microelectromechanical systems microphone of claim 5 wherein the anchor is formed at a low temperature.

13. The microelectromechanical systems microphone of claim 5 wherein the anchor forms a ring around an edge of the membrane.

14. The microelectromechanical systems microphone of claim 5 wherein the membrane has been released such that it has substantially no intrinsic stress.

15. The microelectromechanical systems microphone of claim 5, wherein the MEMS microphone is a piezoelectric MEMS microphone.

16. The microelectromechanical systems microphone of claim 15 wherein the membrane comprises three electrodes, and two piezoelectric film layers.

17. The microelectromechanical systems microphone of claim 5 wherein the MEMS microphone is a capacitive MEMS microphone.

18. A method for manufacturing a microelectromechanical systems (MEMS) microphone, comprising:
depositing a membrane on a first sacrificial layer, wherein the first sacrificial layer is deposited on a substrate;
etching the substrate to define a cavity;
forming at least one anchor at an edge of the membrane;
depositing a second layer of sacrificial layer on top of the deposited membrane, where the first and second sacrificial layers form a single sacrificial layer;
dry etching the single sacrificial layer at the edge of the membrane to expose at least one section of the membrane;
depositing a layer of polysilicon on the remaining single sacrificial layer;
etching areas of the polysilicon layer such that there is at least one section of polysilicon layer remaining and at least one section of single sacrificial layer exposed; and
removing the single sacrificial layer to release the membrane.

19. The method of claim 2 wherein the method of forming at least one anchor further comprises depositing a material at least within the etched areas of the photoresist layer such that the material forms the at least one anchor at the edge of the membrane.

20. The method of claim 18 further comprising:
bonding a cap wafer onto the at least one remaining section of polysilicon layer;
depositing a layer of material at least within the etched areas of the polysilicon layer such that the material forms the at least one anchor at the edge of the membrane; and
removing the cap wafer.

21. The method of claim 18 further comprising bonding a wafer onto the at least one remaining section of polysilicon layer, wherein the wafer comprises a sound port and at least one stopper, where the at least one stopper is in contact with the membrane once the wafer is bonded to the at least one remaining section of polysilicon layer.

* * * * *